United States Patent
Nakamura et al.

(10) Patent No.: US 7,254,414 B2
(45) Date of Patent: Aug. 7, 2007

(54) SOUND DATA DELIVERING SYSTEM, SOUND DATA DELIVERY METHOD, DELIVERING SERVER UTILIZED IN THE SOUND DATA DELIVERING SYSTEM, CLIENT-SIDE TERMINAL UTILIZED IN THE SOUND DATA DELIVERING SYSTEM, AND COMPUTER-READABLE RECORDING MEDIUM CONTAINING A PROGRAM APPLIED TO A COMPUTER UTILIZED IN THE SOUND DATA DELIVERING SYSTEM

(75) Inventors: Shunsuke Nakamura, Hamamatsu (JP); Yutaka Hasegawa, Hamamatsu (JP); Takashi Kunii, Hamamatsu (JP); Kosei Terada, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 470 days.

(21) Appl. No.: 09/875,762

(22) Filed: Jun. 5, 2001

(65) Prior Publication Data

US 2001/0049641 A1    Dec. 6, 2001

(30) Foreign Application Priority Data

Jun. 5, 2000    (JP) ............................. 2000-167756

(51) Int. Cl.
*H04M 1/00* (2006.01)
*H04B 1/034* (2006.01)

(52) U.S. Cl. .................................. 455/556.1; 455/100

(58) Field of Classification Search ................ 455/414, 455/556.1; 382/100
See application file for complete search history.

(56) References Cited

U.S. PATENT DOCUMENTS 5,636,276 A * 6/1997 Brugger ...................... 705/54
5,661,787 A * 8/1997 Pocock ................... 379/101.01
6,018,654 A * 1/2000 Valentine et al. ......... 455/414.4
6,385,596 B1 * 5/2002 Wiser et al. .................... 705/51

(Continued)

FOREIGN PATENT DOCUMENTS

DE          19943306        4/2000

(Continued)

OTHER PUBLICATIONS

Hacker, S.; Mar. 2003, MP3: The Definite Guide; O'Reilly.*

*Primary Examiner*—Rasha S. AL-Aubaidi
(74) *Attorney, Agent, or Firm*—Morrison & Foerster LLP

(57) ABSTRACT

In accordance with a request from a portable telephone 60, a sound data delivering server 20 delivers a trial-listening music data to the portable telephone without charging a fee to a user of the portable telephone, or delivers a regular music data to the portable telephone upon charging a fee to the user. The delivered trial-listening music data is actually reproduced by the portable telephone; however, the number of reproduction times is limited, and the trial-listening music data is erased from a memory (RAM 63) of the portable telephone after the trial-listening music data is reproduced for the predetermined number of reproduction times. Thus, a system is provided in which the user of the portable telephone can obtain the trial-listening music data of an incoming call melody without being charged for the fee, and can actually reproduce the trial-listening music data with the use of the user s portable telephone.

12 Claims, 18 Drawing Sheets

U.S. PATENT DOCUMENTS

| | | | |
|---|---|---|---|
| 6,522,769 B1 * | 2/2003 | Rhoads et al. | 382/100 |
| 6,681,120 B1 * | 1/2004 | Kim | 455/556.1 |
| 2001/0030660 A1 * | 10/2001 | Zainoulline | 345/720 |

FOREIGN PATENT DOCUMENTS

| | | |
|---|---|---|
| JP | 02-292634 | 12/1990 |
| JP | 10-224839 | 8/1998 |
| JP | 11-127262 | 5/1999 |
| JP | 11127262 | 5/1999 |
| JP | 2000-134332 | 5/2000 |
| JP | 2001-110135 | 4/2001 |
| WO | WO-96/15611 | 5/1996 |
| WO | WO-98/25397 | 6/1998 |
| WO | WO-00/70896 | 11/2000 |
| WO | WO-01/41023 | 6/2001 |

* cited by examiner

FIG.6A

```
<Music list>
 1. abcde
 2. fghij
 3. klmno
 4. pqrst
```

Screen 1

FIG.6B

```
<On the selected music>
 1. Trial listening
 2. Purchase
```

Screen 2

FIG.6C

```
<Purchase of the
 trial-listening music>
 1. I wish to purchase.
 2. I do not wish to purchase.
```

Screen 3

FIG.8A
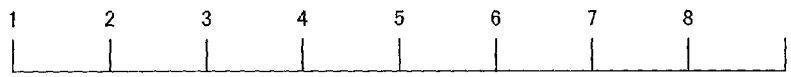
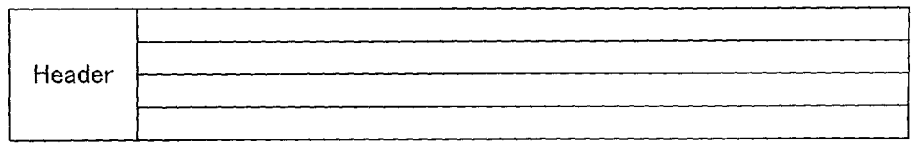
FIG.8B
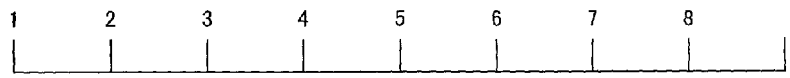
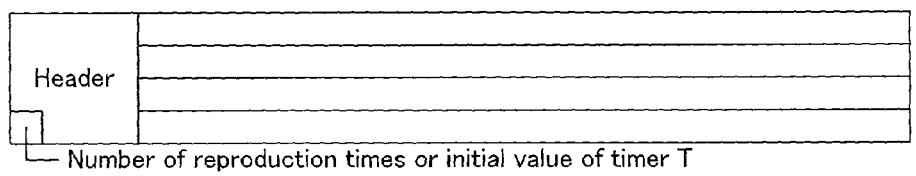
Number of reproduction times or initial value of timer T
FIG.8C
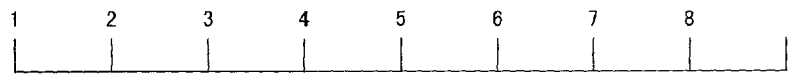
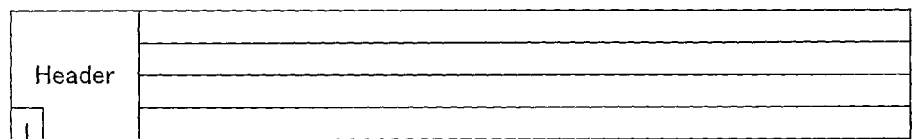
Data indicative of trial-listening music data or regular music data
FIG.8D
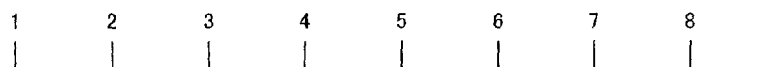
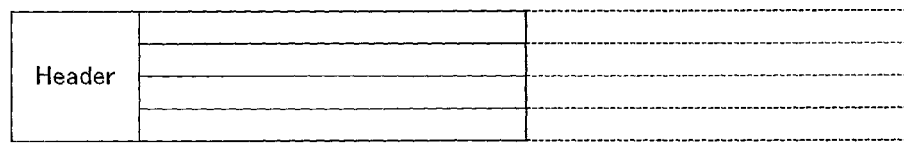
FIG.8E
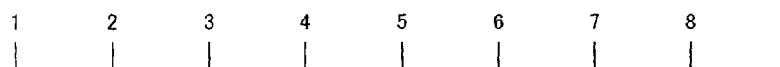
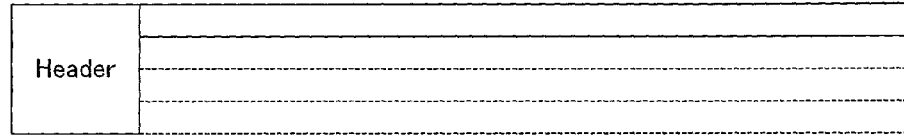

SOUND DATA DELIVERING SYSTEM, SOUND DATA DELIVERY METHOD, DELIVERING SERVER UTILIZED IN THE SOUND DATA DELIVERING SYSTEM, CLIENT-SIDE TERMINAL UTILIZED IN THE SOUND DATA DELIVERING SYSTEM, AND COMPUTER-READABLE RECORDING MEDIUM CONTAINING A PROGRAM APPLIED TO A COMPUTER UTILIZED IN THE SOUND DATA DELIVERING SYSTEM

BACKGROUND OF THE INVENTION

1. Field of the Invention

The present invention relates to a system having a client-side terminal (for example, a portable telephone) and a sound data delivering server that are communicable with each other for delivering a sound data (for example, a melody for announcing an incoming call (hereinafter called "an incoming call melody"), which is reproduced by the client-side terminal at a predetermined timing (for example, when the portable telephone receives a call), from the sound data delivering server to the client-side terminal.

2. Description of the Background Art

In accordance with the development of communication technique in recent years, portable telephones, mobile computers, and others utilizing the wireless technique are becoming widespread as one of the communicable client-side terminals. On the other hand, as a service that these client-side terminals can receive, a sound data delivering service (referred to as incoming call melody requesting service in the case of portable telephones) is also spreading widely.

Generally, in these services, a user of the client-side terminal can select a desired sound data from numerous sound data prepared in a sound data delivering server. Further, the sound data delivering server is configured to deliver a selected sound data to the client-side terminal and to charge a fee to the user of the client-side terminal.

However, in the above-mentioned service, when the sound data is delivered to the client-side terminal, the delivered sound data is registered in a non-volatile memory of the client-side terminal, whereby one of the sound data registered in the client-side terminal is automatically erased. For this reason, the above-mentioned service is not fully satisfactory to the user if the user of the client-side terminal eventually feels that the music reproduced on the basis of the newly delivered sound data is not preferable or if the user feels that the music reproduced on the basis of the erased sound data is more preferable.

Therefore, the apparatus disclosed in Japanese Patent Laid-open Publication No. 11-127262/1999, for example, is constructed in such a manner that the delivered sound data is not immediately registered in the non-volatile memory but, instead of this, the delivered sound data is stored in a volatile memory to be capable of being subjected to trial listening (reproducible) and, when a predetermined key operation is carried out in accordance with the result of trial-listening, the sound data is registered in the non-volatile memory.

However, in the above-mentioned prior-art technique, the sound data for trial-listening (trial-listening sound data) and the sound data for registration (regular sound data) are not differentiated, so that even if the user of the client-side terminal wishes the sound data to be delivered for trial listening, the user is charged for the fee every time the sound data is delivered to the client-side terminal. For this reason, if the result of trial listening is not preferable for the user, the above-mentioned prior-art service is not fully satisfactory to the user. Therefore, one of the objects of the present invention is to provide a system, a method, a delivering server constituting the system, a client-side terminal which is substantially a computer as well, and a computer-readable recording medium, in which the user can carry out the trial-listening of the delivered sound data without being charged for the fee (or by being charged for a fee less expensive than in the case of properly purchasing the sound data).

SUMMARY OF THE INVENTION

In order to achieve the aforesaid object of the present invention, a characteristic aspect of the present invention lies in a sound data delivering system having a client-side terminal and a delivering server that are communicable with each other, said delivering server comprising: request determining means for determining whether a request from said client-side terminal is a request of a regular sound data or a request of a trial-listening sound data; and data delivering means for delivering the regular sound data to the client-side terminal with charging a fee to a user of the client-side terminal if the request from said client-side terminal is determined to be a request of said regular sound data, and for delivering the trial-listening sound data to the client-side terminal without charging a fee to the user of the client-side terminal if the request from the client-side terminal is determined to be a request of said trial-listening sound data, and said client-side terminal comprising: storage means for storing said delivered regular sound data and said delivered trial-listening sound data; and reproduction means for generating a sound in accordance with said stored sound data to reproduce the sound data.

The delivering server in the present invention may be configured to store numerous sound data, for example, in a database of sound data, to deliver a list of the sound data to the client-side terminal in accordance with a request from the client-side terminal, and to deliver to the client-side terminal a regular sound data or a trial-listening sound data corresponding to the sound data selected from the list by the user of the client-side terminal. If the client-side terminal is, for example, a portable telephone, the sound data may be a sound data for generating an incoming call melody of the portable telephone (a melody as a ringing tone which responses to an incoming call) or may be another sound data such as sound effects. Further, the regular sound data and the trial-listening sound data may be constructed to include the same sound data provided that at least one of the two includes a data that can distinguish one from the other. The reproduction means is means that is used for generating a sound in accordance with the sound data obtained from the delivering server by the client-side terminal under a predetermined condition and, if the client side terminal is for example a portable telephone, the reproduction means corresponds to a sound source circuit, an effect circuit, and a sound system including an amplifier and a speaker for generating incoming call melodies.

According to the above aspect, if the user of the client-side terminal wishes a trial-listening, the user can request a trial-listening sound data, and the delivering server delivers the trial-listening sound data to the client-side terminal without charging a fee to the user when the request of the trial-listening data is transmitted from the client-side terminal to the delivering server. The delivered trial-listening sound data is stored in storage means of the client-side terminal, and is reproduced by reproduction means. As a result of this, the user can obtain a trial-listening sound data without being charged for the fee, and can consider whether or not to purchase the regular sound data on the basis of the result of trial-listening. It is noted that "without charging for a fee" in this specification including claims means "with charging for no fee or fee less than the fee charged for the regular sound data".

Another characteristic aspect of the present invention lies in a sound data delivering system having a client-side terminal and a delivering server that are communicable with each other, said delivering server comprising: request determining means for determining whether a request from said client-side terminal is a request of a regular sound data or a request of a trial-listening sound data; and data delivering means for delivering said regular sound data to a user of the client-side terminal if the request from said client-side terminal is determined to be a request of said regular sound data, and for delivering the trial-listening sound data to the client-side terminal if the request from the client-side terminal is determined to be a request of said trial-listening sound data, and said client-side terminal comprising: storage means for storing said delivered regular sound data and said delivered trial-listening sound data; reproduction means for generating a sound in accordance with said stored sound data to reproduce the sound data; and reproduction times limiting means for limiting the number of times said trial-listening sound data is reproduced by said reproduction means, to a predetermined finite number.

This allows that, in accordance with the request from the client-side terminal, the delivering server delivers the regular sound data or the trial-listening sound data to the client-side terminal, and the client-side terminal can reproduce the sound data by the reproduction means. Further, the number of times the trial-listening data is reproduced is limited to a predetermined finite number by the reproduction times limiting means.

Here, it is preferable that the delivering server may charge a predetermined fee to the user upon (or for) delivering the regular sound data, and may charge a fee less expensive than the aforesaid predetermined fee to the user upon (or for) delivering the trial-listening sound data. Alternatively, the delivering server may not charge a fee at all to the user upon delivering the trial-listening sound data.

In this case, it is also preferable that the client-side terminal further comprises data erasing means for erasing the trial-listening sound data from the storage means when (and after) the trial-listening sound data is reproduced for the predetermined finite number of times by the reproduction means.

Still another characteristic aspect of the present invention lies in a sound data delivering system having a client-side terminal and a delivering server that are communicable with each other, said delivering server comprising: request determining means for determining whether a request from said client-side terminal is a request of a regular sound data or a request of a trial-listening sound data; and data delivering means for delivering said regular sound data to a user of the client-side terminal if the request from said client-side terminal is determined to be a request of said regular sound data, and for delivering the trial-listening sound data to the client-side terminal if the request from the client-side terminal is determined to be a request of said trial-listening sound data, and said client-side terminal comprising: storage means for storing said delivered regular sound data and said delivered trial-listening sound data; reproduction means for generating in accordance with said stored sound data to reproduce the sound data; and reproduction permitting period limiting means for prohibiting the reproduction of the trial-listening sound data when a predetermined period of time passes after said trial-listening sound data becomes reproducible by the client-side terminal or after the trial-listening sound data is reproduced for the first time by the client-side terminal.

This allows that, in accordance with the request from the client-side terminal, the delivering server delivers the regular sound data or the trial-listening sound data to the client-side terminal, and the client-side terminal can reproduce the sound data by the reproduction means. Further, the reproduction permitting period limiting means prohibits the reproduction of the trial-listening data when a predetermined period of time passes after the trial-listening sound data becomes reproducible by the client-side terminal or after the trial-listening sound data is reproduced for the first time by the client-side terminal. In this case, the time when the trial-listening sound data becomes reproducible by the client-side terminal includes the time when the trial-listening sound data is delivered from the delivering server to the client-side terminal. Further, the delivering server may charge a predetermined fee to the user upon delivering the regular sound data, and may charge a fee less expensive than the aforesaid predetermined fee to the user upon delivering the trial-listening sound data. Alternatively, the delivering server may not charge a fee at all to the user upon delivering the trial-listening sound data.

In this case, it is preferable that the client-side terminal further comprises data erasing means for erasing the trial-listening sound data from the storage means when a period of time not shorter than the predetermined period of time passes after the trial-listening sound data becomes reproducible by the client-side terminal or after the trial-listening sound data is reproduced for the first time by the client-side terminal.

Alternatively, this characteristic aspect of the present invention lies in that, in a system according to each of the above-mentioned aspects, the regular sound data is one in which a data indicating that the sound data is a regular sound data is added to the trial-listening sound data, and the reproduction means of the client-side terminal is configured in such a manner that, when the reproduction means recognizes that the data to be reproduced is a trial-listening sound data by determining whether the data indicating the regular sound data is present or not, the reproduction means reproduces the sound data by generating a sound in accordance with only a portion of the sound data.

According to these characteristic aspects, only a portion of the regular sound data is reproduced at the time of trial listening. That is, in order for the client-side terminal to perform a reproduction which is a little inferior to the reproduction of the regular sound data itself (for example, a reproduction of only a portion of the sound data in length or, a reproduction of a portion of the parts if the sound data is a music data composed of a plurality of parts), at the time of trial listening, the delivering server side can merely prepare a data in which a data indicating whether the sound data is a regular sound data or a trial-listening sound data is added to either one of the regular sound data and the trial-listening sound data. By this feature, the storage capacity (of the database or the like) of the delivering server side can be reduced. Further, the system can be constructed in such a manner that, if the user requests (the purchasing of) the regular sound data after trial listening, only the data indicating whether the sound data is a regular sound data or a trial-listening sound data is deleted from the regular sound data or the trial-listening sound data, whereby the need for delivering the whole sound data again is eliminated and the period of time needed for communication can be reduced.

Still another characteristic aspect of the present invention lies in that, in a system according to each of the above-mentioned aspects, the trial-listening sound data is constructed with a portion of the regular sound data so that only a portion of the regular sound data may be reproduced at the time of trial listening in the client-side terminal. In this case, the trial-listening sound data may consist only of a portion of the length of the regular sound data, or alternatively, if the regular sound data is constructed with a plurality of parts, the trial-listening sound data may be constructed only with a portion of the plurality of parts.

Still another characteristic aspect of the present invention lies in that, in a system according to each of the above-mentioned aspects, the trial-listening sound data is constructed with a proportion of the regular sound data so that only a proportion of the regular sound data may be reproduced at the time of trial listening in the client-side terminal. In this case, the trial-listening sound data may consist only of a proportion of the length of the regular sound data, or alternatively, if the regular sound data is constructed with a plurality of parts, the trial-listening sound data may be constructed only with a proportion of the plurality of parts.

Still another characteristic aspect of the present invention lies in that, in a system according to each of the above-mentioned aspects, the client-side terminal is a portable communication terminal and includes registration means that is configured in such a manner that, if the sound data stored in the storage means is a regular sound data, the registration means registers the sound data as a sound data of a incoming call sound, a warning sound, or a BGM of the portable communication terminal, whereas if the sound data is a trial-listening sound data, the registration means does not register the sound data as a sound data of an incoming call sound, a warning sound, or a BGM of the portable communication terminal, and the reproduction means is configured to reproduce the registered sound data of an incoming call sound, a warning sound, or a BGM respectively when the client-side terminal receives a call, when the portable communication terminal is brought into a state in which the warning sound should be generated, or while a call is being carried out using the portable communication terminal or an answering message of the portable communication terminal as an answering telephone machine (answering telephone service) is being generated (reproduced). In this case, the aforesaid predetermined condition includes an input operation that the user of the portable communication terminal performs for registering the sound data as an incoming call sound, a warning sound, or a BGM (background music).

This allows that the regular sound data can be registered as an incoming call sound, a warning sound, or a BGM, whereas the trial-listening sound data is prohibited from being registered as an incoming call sound, a warning sound, or a BGM.

In this case, it is preferable that the registration means is configured to permit registration of the trial-listening sound data as a sound data of an incoming call sound, a warning sound, or a BGM of the portable communication terminal when an instruction for purchasing the sound data is transmitted from the portable communication terminal to the delivering server. In this case, the delivering server may be configured to charge a fee to the user of the portable communication terminal based on the instruction for purchase.

Still another characteristic aspect of the present invention lies in a sound data delivering system having a client-side terminal and a delivering server that are communicable with each other, said delivering server comprising: request determining means for determining whether a request from said client-side terminal is a request of a regular sound data or a request of a trial-listening sound data; and data delivering means for delivering said regular sound data to a user of the client-side terminal if the request from said client-side terminal is determined to be a request of said regular sound data, and for stream-delivering (streaming) said trial-listening sound data to the client-side terminal if the request from the client-side terminal is determined to be a request of said trial-listening sound data, and said client-side terminal comprising: storage means for storing said delivered regular sound data; and reproduction means for generating a sound in accordance with said stored regular sound data to reproduce the regular sound data, and for storing a portion of said trial-listening sound data, which is stream-delivered, in one buffer and generating a sound in accordance with said stored data in the buffer (for reproduction thereof) every time said client-side terminal receives the portion of said trial-listening sound data through stream-delivering (streaming).

In this case, the delivering server may charge a predetermined fee to the user upon delivering the regular sound data, and may charge a fee less expensive than the aforesaid predetermined fee to the user upon delivering the trial-listening sound data. Alternatively, the delivering server may not charge a fee at all to the user upon delivering the trial-listening sound data.

According to this construction, the trial-listening sound data is stream-delivered from the delivering server to the client-side terminal. Further, the client-side terminal stores a portion of the trial-listening sound data in one buffer for reproduction thereof every time the client-side terminal receives the portion of the trial-listening sound data through stream-delivering. This can prevent the user from carrying out the trial listening over and over again, since the trial-listening sound data does not remain in the client-side terminal.

It is noted that through this specification, "without charging a fee for delivering the trial-listening sound data" means "with charging no fee or a fee less expensive than a fee charged for delivering the regular sound data".

BRIEF DESCRIPTION OF THE DRAWINGS

FIG. 6A is a model view illustrating contents displayed on a display of a portable telephone in the present invention;

FIG. 6B is a model view illustrating contents displayed on a display of a portable telephone in the present invention;

FIG. 6C is a model view illustrating contents displayed on a display of a portable telephone in the present invention;

FIG. 8A is a view for describing structures of a regular music data and a trial-listening music data used in the present invention;

FIG. 8B is a view for describing structures of a regular music data and a trial-listening music data used in the present invention;

FIG. 8C is a view for describing structures of a regular music data and a trial-listening music data used in the present invention;

FIG. 8D is a view for describing structures of a regular music data and a trial-listening music data used in the present invention;

FIG. 8E is a view for describing structures of a regular music data and a trial-listening music data used in the present invention;

DESCRIPTION OF THE PREFERRED EMBODIMENTS

Hereafter, preferred embodiments of the sound data delivering system according to the present invention will be described with reference to the attached drawings.

Embodiment 1

Figure 1:
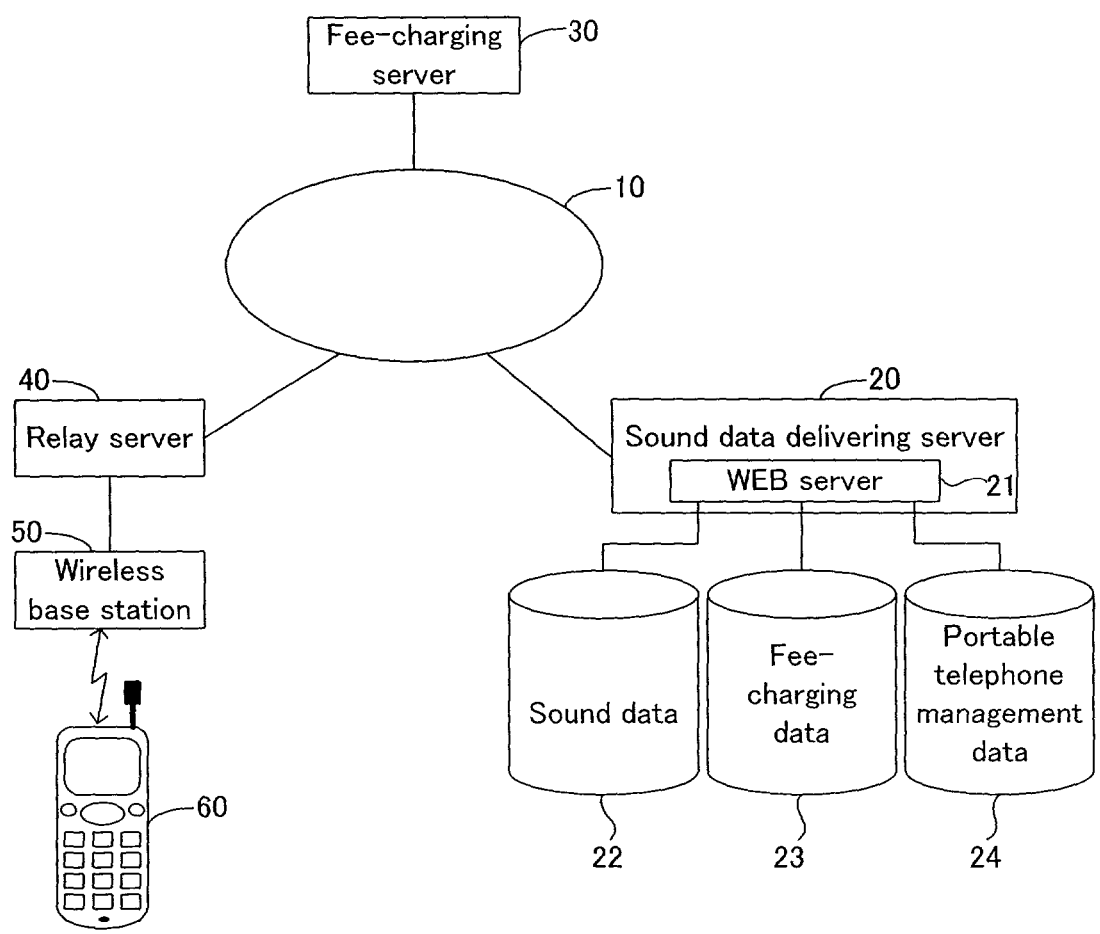
FIG. 1 is a schematic view of a sound data delivering system of the present invention.

FIG. 1 is a schematic systematic view of a sound data delivering system (music data delivering system, incoming call melody delivering system) according to embodiment 1 of the present invention. This system is constructed using the internet 10. A sound data delivering server 20, a fee-charging server 30, and a relay server 40 are connected to the internet 10, and a wireless base station 50 is connected to relay server 40. A portable telephone 60 serving as a client-side terminal is constructed to be mutually communicable (capable of exchanging data) with sound data delivering server 20 via wireless base station 50, relay server 40, and the internet 10. Here, the internet 10 may be a communication line such as an exclusive-use line (this communication line is not limited to a wired line, but is meant to include a wireless line such as a satellite communication line), and the client-side terminal is not limited to portable telephone 60 but may be a mobile computer or a PDA (personal digital assistant) which is a communicable apparatus including a computer.

Sound data delivering server 20 is constructed to include a computer for delivering regular sound data and trial-listening sound data to portable telephone 60 in accordance with a request from portable telephone 60. Sound data delivering server 20 includes a WEB server 21, a database 22 of sound data that stores numerous sound data (in this example, numerous regular music data used as incoming call melodies and numerous trial-listening music data respectively corresponding to the regular music data) as contents, a fee-charging database 23 that stores information for charging a fee to a user of portable telephone 60, and a portable telephone management database 24 that stores data on the user of portable telephone 60 including a portable telephone number, a password number, a user name, and others. WEB server 21 is actually a program stored in the computer, and takes out necessary data from databases 22 to 24 to supply the data to fee-charging server 30 or relay server 40 in accordance with a predetermined communication protocol (for example, HTTP), and processes the data supplied from fee-charging server 30 or relay server 40 in accordance with a predetermined communication protocol to store the data in databases 22 to 24 in accordance with the needs.

Fee-charging server 30 is constructed to include a computer for performing management of fee-charging on the user, and is adapted to charge a fee to the user of portable telephone 60 in accordance with the data supplied from sound data delivering server 20 via the internet 10. Specifically, fee-charging server 30 is constructed to perform necessary data communication with the computer of a financial institution (bank) where the user has an account (bank account) to draw out a fee for utilizing the sound data delivering service automatically from the account of the user. Here, fee-charging server 30 may be constructed to issue a bill to the user and to send the bill to the user by postal mail. The financial institution may be a managing company of a credit card owned by the user. Further, the fee may be charged by adding the fee for purchasing the sound data to the fee for phone calls carried out by portable telephone 60. The system for charging the fee may be either a specific-fee system in which a predetermined fee (for example, 50 yen per one piece of music) is charged every time one piece of music (sound data for one piece of music) is purchased or a fixed-fee system in which a predetermined basic fee allows purchase of a predetermined plural number of music pieces within a predetermined period of time (for example, ten pieces of music can be purchased for 300 yen within one month), and the remaining number of music pieces that can be purchased within the predetermined period of time is decremented every time one piece of music is purchased. Alternatively, a system combining the aforesaid two systems, i.e. the specific-fee system and the fixed-fee system, may be adopted (for example, a predetermined basic fee is charged if the number of music pieces purchased within a predetermined period of time does not exceed a predetermined plural number, and thereafter, a predetermined fee is charged every time one piece of music is purchased).

Relay server 40 is constructed to include a computer for converting data, which are supplied from sound data delivering server 20 via the internet 10, into a predetermined signal which is transmitted to wireless base station 50. Wireless base station 50 is adapted to modulate the signal supplied from relay server 40 and transmits the modulated signal to portable telephone 60. Further, wireless base station 50 is adapted to demodulate the signal transmitted from portable telephone 60 to supply the demodulated signal to relay server 40. Relay server 40 is adapted to convert the signal, which is supplied from wireless base station 50, into a predetermined data, and to supply the converted data to sound data delivering server 20 in accordance with the aforesaid predetermined communication protocol.

Figure 2:
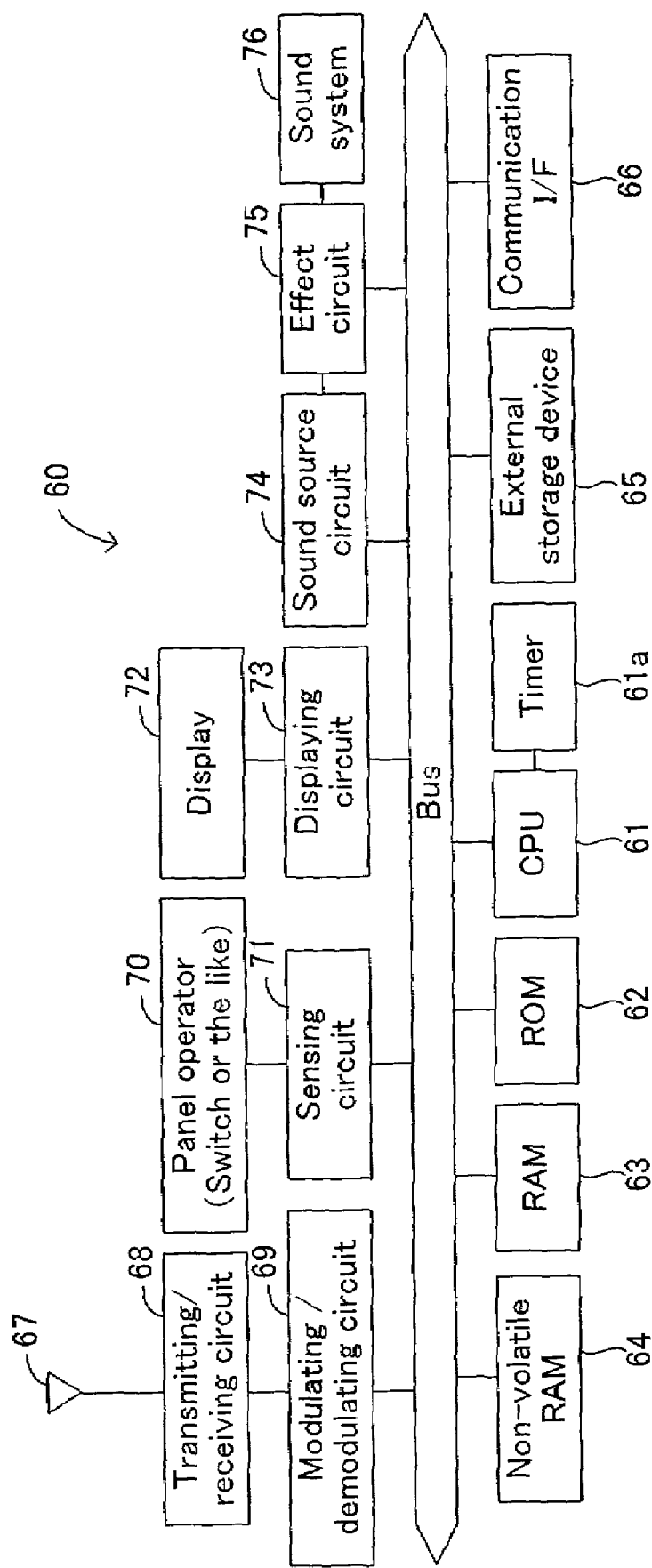
FIG. 2 is a block diagram schematically illustrating a construction of a portable telephone used in the present invention.

Portable telephone 60 includes a CPU 61, a ROM 62, a RAM 63, a non-volatile RAM 64, an external storage device 65 such as a memory card, and a communication interface 66 that allows data communication with another computer via a wired line, as shown in the block diagram of FIG. 2. These are connected with each other via a bus, and are adapted to be controlled by CPU 61. Here, non-volatile RAM 64 may be an EEPROM.

Further, portable telephone 60 includes an antenna 67, a transmitting/receiving circuit 68 connected to antenna 67, a modulating/demodulating circuit 69 connected to transmitting/receiving circuit 68 to demodulate the received signal received by antenna 67 and to modulate the signal given by the control of CPU 61 to be transmitted from antenna 67, a panel operator 70 having a plurality of press-button type switches or the like for inputting a telephone number or other instructions, a sensing circuit 71 connected to panel operator 70 for sensing the switching of panel operator 70, a display 72 for displaying numeral and character information, a display circuit 73 for controlling the display of display 72, a sound source circuit 74, an effect circuit 75 connected to sound source circuit 74, and a sound system 76 connected to the effect circuit 75 and including an amplifier and a speaker. Among these, modulating/demodulating circuit 69, sensing circuit 71, display circuit 73, sound source circuit 74, and effect circuit 75 are connected with each other via a bus, and are adapted to be controlled by CPU 61. Here, sound source circuit 74, effect circuit 75, and sound system 76 together with CPU 62, RAM 63, and non-volatile RAM 64 constitute the reproduction means.

CPU 61 is adapted to execute a program stored in ROM 62 and external storage device 65 while utilizing the clock information of a timer 61 a connected to CPU 61. RAM 63 is adapted to function as storage means for temporarily storing data such as data necessary for CPU 61 to execute the above-mentioned program and received sound data. Non-volatile RAM 64 is adapted to be capable of storing and holding the data, which has been written when a main power source (not illustrated) is on, even when the main power source is off, and is adapted to supply the data stored and held in CPU 61 in accordance with a request from CPU 61 when the main power source is on. This non-volatile RAM 64 constitutes a portion of the registration means for registering an incoming call melody that is played from sound system 76 by portable telephone 60 when portable telephone 60 receives a call.

Next, an operation of the sound data delivering system thus constructed will be described with reference to FIGS. 3 to 11.

First, a case will be described in which a proper user of portable telephone 60 purchases (obtains) a desired incoming call melody (sound data, music data) after trial listening of the incoming call melody. When the user operates panel operator 70 to enter an incoming call melody obtaining mode while the main power source (not illustrated) of portable telephone 60 is on, CPU 61 of portable telephone 60 (hereafter simply referred to as "portable telephone 60") starts a process of the incoming call melody obtaining routine shown in FIG. 3 from step 300.

Portable telephone 60 then proceeds to step 305 to determine whether an instruction for connecting portable telephone 60 to sound data delivering server 20 has been given or not. This instruction for connection is a transmitting operation by which the user connects portable telephone 60 to a destination (i.e. sound data delivering server 20) having a specific telephone number or a specific URL (uniform resource locator). If this instruction for connection has been given, portable telephone 60 determines as "Yes" in step 305 and proceeds to step 310 to carry out a process for connecting portable telephone 60 to sound data delivering server 20 (See the arrow (1) in FIG. 5).

Figure 4:
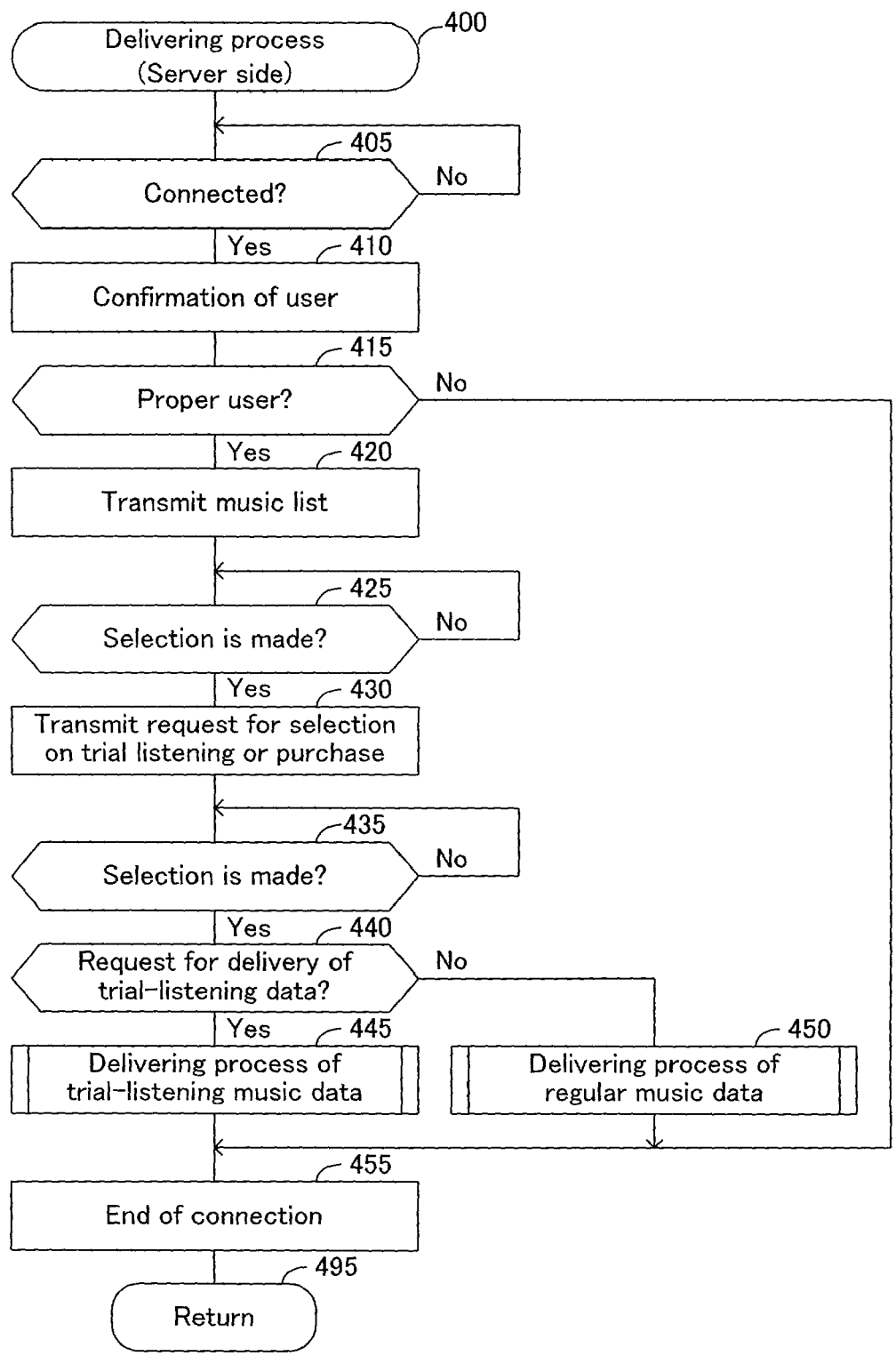
FIG. 4 is a flowchart of an incoming call melody delivering process routine executed by a sound data delivering server according to embodiment 1 of the present invention.
Figure 5:
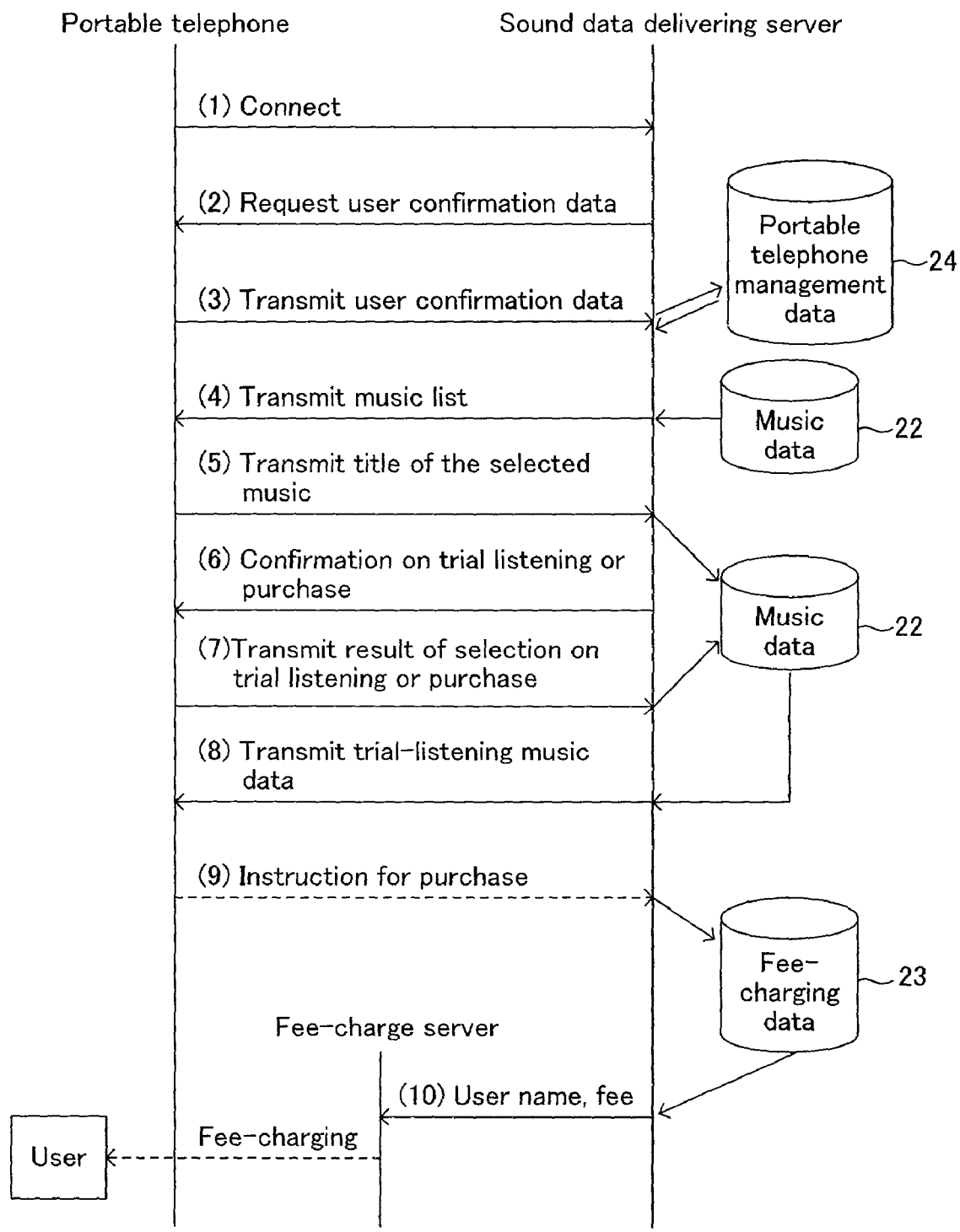
FIG. 5 is a view illustrating a data flow between a portable telephone and a sound data delivering server when a user of the portable telephone obtains a trial-listening music data in embodiment 1 of the present invention.
Figure 7:
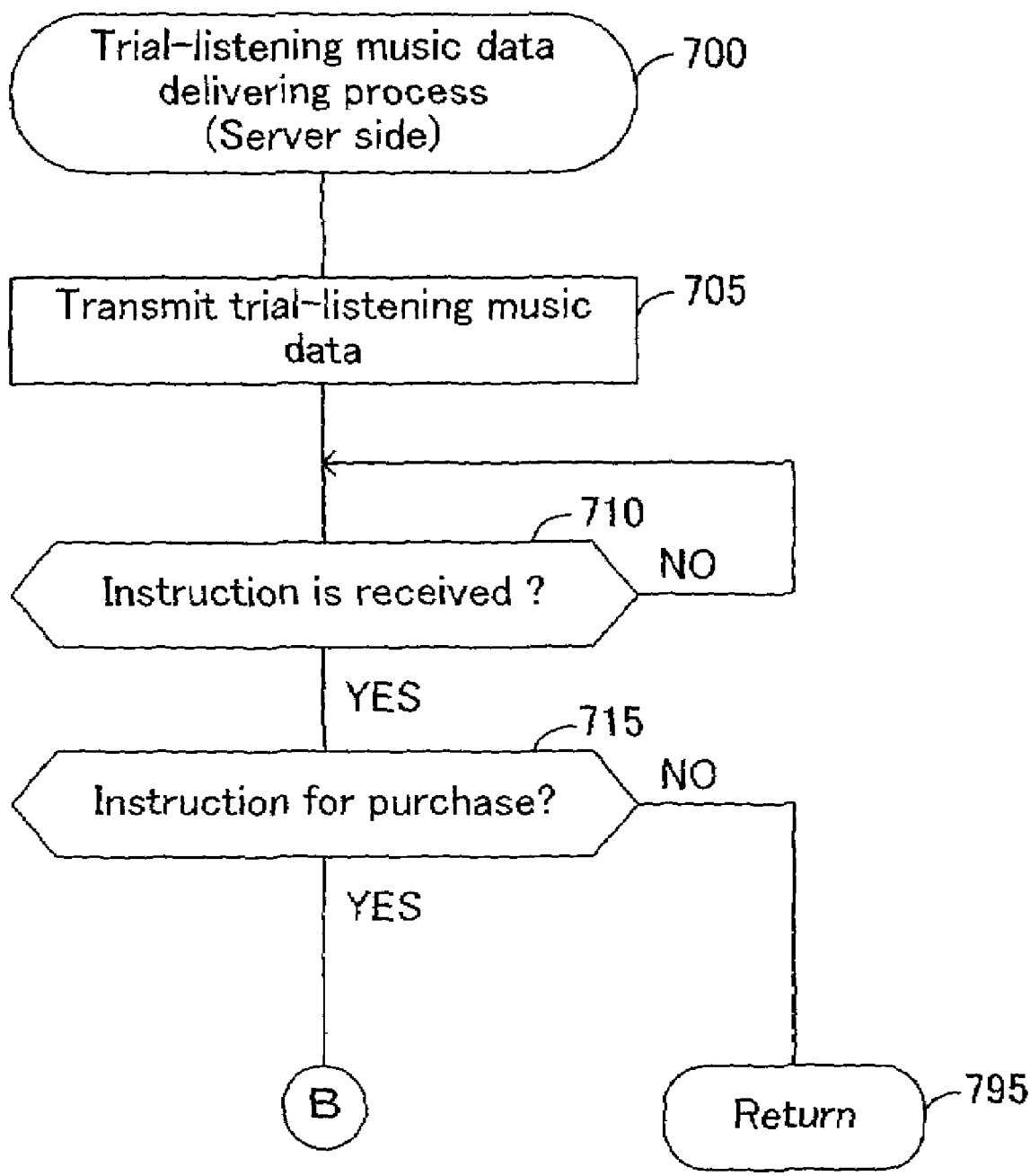
FIG. 7 is a flowchart of a trial-listening music data delivering process routine executed by a sound data delivering server according to embodiment 1 of the present invention.

On the other hand, sound data delivering server 20 is executing a program for the delivering process shown in FIG. 4 and is monitoring whether portable telephone 60 has been connected or not in step 405. Therefore, when connected to portable telephone 60, sound data delivering server 20 determines as "Yes" in step 405 and proceeds to step 410 to transmit to portable telephone 60 a request of data (such as the name of the user and the password number) needed for confirming the user (See the arrow (2) in FIG. 5).

At this time, portable telephone 60 has proceeded to step 315, and performs a data input process for user confirmation in step 315. Specifically, portable telephone 60 displays on display 72 a type of the user confirmation data requested by sound data delivering server 20 to prompt the user to input the data. When the user has input the needed information, portable telephone 60 transmits the input data to sound data delivering server 20 (See the arrow (3) in FIG. 5). Here, the system may be constructed in such a manner that the name of the user, the password number, and others are input only at the user registration in the initial connection, and the needed information is automatically transmitted from portable telephone 60 at the second connection time and afterwards so as to omit data input by the user.

Sound data delivering server 20 that has received the data for user confirmation confirms whether the connected portable telephone 60 is being used by the proper user or not with using the data stored in portable telephone management database 24 in step 410. In this case, since the user of portable telephone 60 is a proper user, sound data delivering server 20 determines as "Yes" in step 415, and proceeds to step 420 to read out a list of the music data that can be delivered from the music database 22 to portable telephone 60, and transmits the list to portable telephone 60 (See the arrow (4) in FIG. 5). Here, if the connection is not made by a proper user, sound data delivering server 20 determines as "No" in step 415, and proceeds to step 455 to carry out a process for ending the connection to portable telephone 60 and ends this routine in step 495 to return to step 400.

On the other hand, portable telephone 60 is configured to monitor whether a list of music data has been received or not in step 320, so that if the list of music data is received, portable telephone 60 determines as "Yes" in step 320 and proceeds to step 325 to display the received music list on display 72 (See the screen 1 in FIG. 6A). Here, regarding the list of the music data, the system may be constructed in such a manner that the user inputs a predetermined search condition (genre of music, artist name, lyrics at the beginning of the music, etc.) from portable telephone 60 to transmit the search condition to sound data delivering server 20 so that sound data delivering server 20 may deliver to portable telephone 60 a music list consisting only of the music pieces that satisfy the transmitted search condition.

By making a reference to the displayed screen, the user of portable telephone 60 operates panel operator 70 to select a desired music piece. FIG. 6A shows a state in which a second music piece ("fghij") has been selected. At this time, portable telephone 60 has proceeded to step 330 and is monitoring whether any music piece has been selected from the music pieces displayed on display 72. If a music piece has been selected, portable telephone 60 proceeds to step 335 to transmit to sound data delivering server 20 the data that specifies the selected music piece (See the arrow (5) in FIG. 5).

Sound data delivering server 20 is monitoring whether a music piece has been selected or not in step 425. Thus, when the data transmitted from portable telephone and specifying the selected music piece is received, sound delivering server 20 proceeds to step 430 to transmit data for requesting selection on whether the user of portable telephone 60 wishes trial listening of the selected music piece (trial-listening music data) or purchase of the selected music piece (regular music data) (See the arrow (6) in FIG. 5).

At this time, portable telephone 60 is monitoring whether the data requesting selection on trial-listening or purchase has been received or not in step 340. Therefore, when the data requesting selection on trial-listening or purchase is received, portable telephone 60 determines as "Yes" in step 340 and proceeds to step 345 to display a screen for prompting the user to make a selection on whether the user wishes trial-listening or purchase of the selected music data (See screen 2 in FIG. 6B). Next, portable telephone 60 waits for selection on "trial-listening" or "purchase" in step 350 and, when the user selects either "trial-listening" or "purchase" by operating panel operator 70, and when the user selects either "trial-listening" or "purchase", portable telephone 60 proceeds to step 355 to transmit the result of selection to sound data delivering server 20 (See the arrow (7) in FIG. 5).

Sound data delivering server 20 is monitoring the receiving of the result of selection in step 435, so that when the result of selection is received, sound data delivering server 20 proceeds to step 440 to determine whether the user of portable telephone 60 wishes trial-listening of the selected music piece or not on the basis of the result of selection. In this case, since the user wishes trial-listening, sound data delivering server 20 determines as "Yes" in step 440 and proceeds to step 445 to carry out a process on the trial-listening music data. Specifically, sound data delivering server 20 starts the process of the trial-listening music data delivering processing routine shown in detail in FIG. 7 from step 700 and transmits the trial-listening music data corresponding to the selected music in step 705 (See the arrow (8) in FIG. 5).

Here, to provide description on the trial-listening data, FIG. 8A shows a regular music data, whereas FIG. 8B shows a trial-listening music data used in this embodiment. The regular sound data includes four parts and is composed of eight bars. A header having a tone, a tempo, and others of each part written therein is disposed before the first bar. The trial-listening music data is different from the regular music data in that a data indicating that this music data is a trial-listening music data and a data indicating the number of reproduction times (reproduction permitting times) is written within the header in addition to the tone, the tempo, and others of each part.

Referring again to FIG. 3, after carrying out the process of step 355, portable telephone 60 proceeds to step 360 and determines whether the result of selection made by the user is "trial-listening" or not in step 360. In this case, since the user has selected "trial-listening" of the music data, portable telephone 60 determines as "Yes" in step 360 and proceeds to step 365 to execute a trial-listening music data processing routine shown in detail in FIG. 9.

Figure 9:
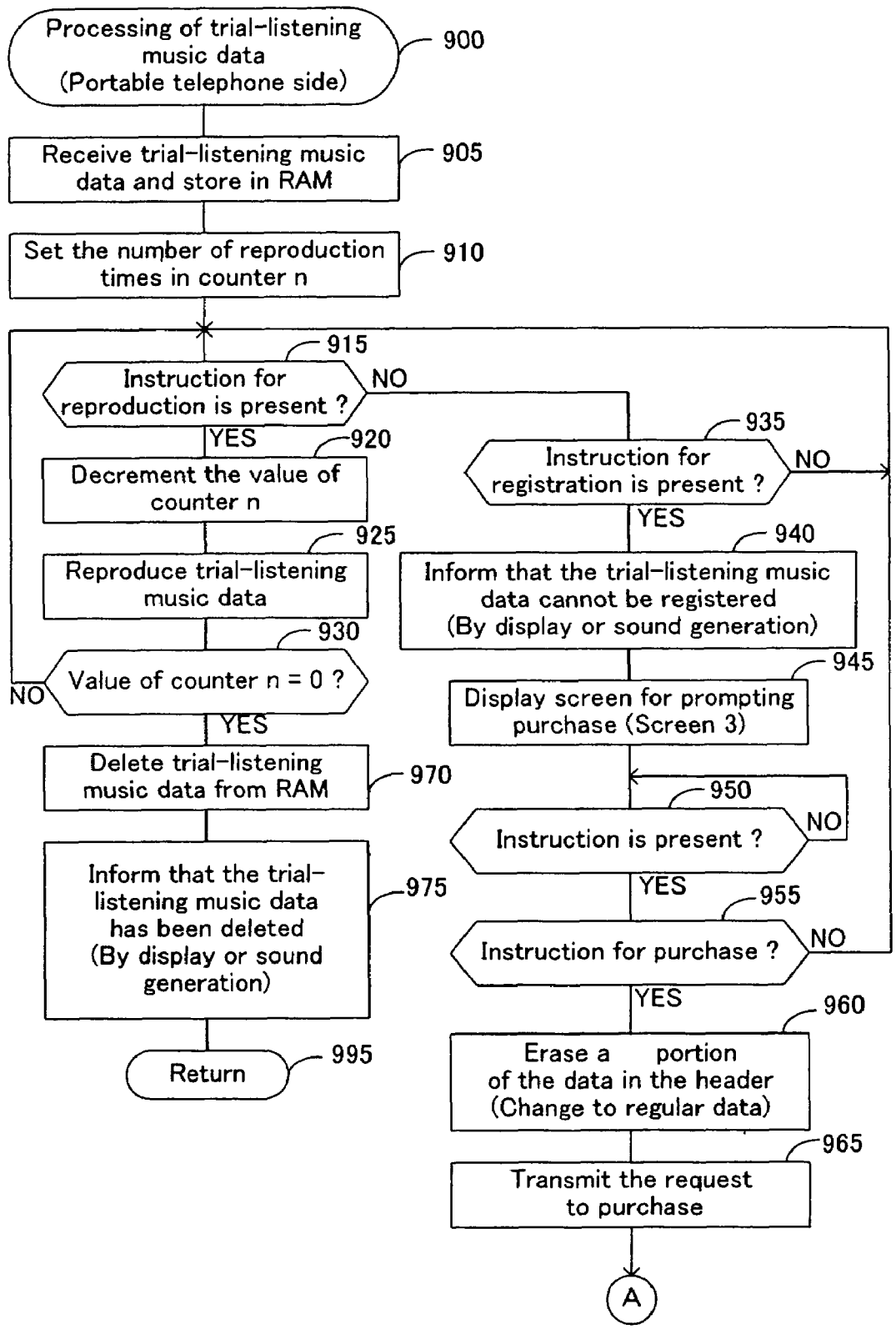
FIG. 9 is a flowchart of a trial-listening music data processing routine executed by a CPU of a portable telephone according to embodiment 1 of the present invention.

Specifically, portable telephone 60 starts the process from step 900 of FIG. 9 and, in step 905, portable telephone 60 receives the trial-listening music data and stores (memorizes) the received trial-listening music data in RAM 63 which is a volatile memory. Next, portable telephone 60 proceeds to step 910 to set the number of reproduction times, which is written in the header of the trial-listening music data (for example, "3", "1" or the like), in counter n, and monitors whether the user has given an instruction for reproducing the trial-listening music data (instruction for trial listening) in step 915.

Now, to provide description assuming that the user has given an instruction for reproducing the trial-listening music data, portable telephone 60 determines as "Yes" in step 915, proceeds to step 920 to decrement (decrease) the value of counter n by "1", and reproduces the trial-listening music data with the use of sound source circuit 74, effect circuit 75, and sound system 76 in step 925. This allows the user to reproduce the delivered trial-listening music data with the use of sound source circuit 74, effect circuit 75, and sound system 76 of the user own portable telephone 60, and to determine whether the regular music data should be purchased or not on the basis of the result of reproduction.

Portable telephone 60 then proceeds to step 930 to determine whether the value of counter n is "0" or not, and if the value of counter n is not "0", portable telephone 60 determines as "No" in step 930 to return to step 915. This allows that, every time an instruction for reproduction is given, portable telephone 60 proceeds to step 920 to decrement the value of counter n and generates a sound on the basis of the trial-listening music data to reproduce the data in step 925. Therefore, when the trial-listening music data is reproduced for the number of reproduction times that has been set in counter n in the previous step 910, the value of counter n becomes "0", whereby portable telephone 60 determines as "Yes" in step 930 to proceed to step 970 to erase (delete) the trial-listening music data from RAM 63, and proceeds to step 975 to notify the user that the trial-listening music data has been deleted from RAM 63 by displaying comments to that effect on display 72 and by issuing an alarming sound using sound system 76. Thereafter, portable telephone 60 returns to step 395 of FIG. 3 via step 995, and ends the incoming call melody obtaining routine. Here, the aforesaid steps 910 to 930 correspond to the reproduction times limiting means for limiting the number of times for reproducing the trial-listening music data, and step 970 corresponds to the data erasing means.

Next, a further description will be provided assuming that the instruction for reproduction has not been given at the time of determination in the aforesaid step 915 of FIG. 9. In this case, portable telephone 60 proceeds to step 935 to determine whether the user has given an instruction to store (register) the trial-listening music data as an incoming call melody in non-volatile RAM 64. If the instruction for registration has not been given at the time of determination in step 935, portable telephone 60 returns to step 915 to determine whether the instruction for reproduction has been given or not again. It should be noted that, the incoming call melody is a piece of music that is played as a paging sound (as a kind of ringing tone) when portable telephone 60 receives a call. Further, the incoming call melody described for explanation herein can be replaced with a warning sound generated when a predetermined condition is satisfied in portable telephone 60 (for example, an alarming sound generated when the set time has come), a BGM used while a call is being carried out by portable telephone 60 or used in answering message of an answering telephone machine, or an appended music data file in sending an electronic mail to another portable telephone, another personal computer, or the like.

If the instruction for registration has been given at the time of determination in the aforesaid step 935, portable telephone 60 proceeds to step 940 to notify that the trial-listening music data cannot be registered as an incoming call melody of portable telephone 60 by displaying comments to that effect on display 72 and generating a specific warning sound from sound system 76. Next, portable telephone 60 proceeds to step 945 to display a screen for confirming whether the user wishes to purchase a regular music data corresponding to the trial-listening music data or not (See screen 3 of FIG. 6C).

Portable telephone 60 then waits for an instruction for "purchasing" or "not purchasing" the regular music data in step 950, and if an instruction has been given, portable telephone 60 proceeds to step 955 to determine whether the instruction is an instruction for purchasing the regular music data or not. If the given instruction is an instruction for purchase, portable telephone 60 proceeds to step 960 to erase a data specific to the trial-listening music data, i.e. the data indicating that the music data is a trial-listening music data and the data indicating the number of reproduction, which is written in the header of the trial-listening music data, thereby to change the trial-listening music data to the regular music data. Portable telephone 60 then proceeds to step 965 to transmit to sound data delivering server 20 a data indicating that the user wishes to purchase the regular music data (See the arrow (9) in FIG. 5). Thereafter, portable telephone 60 proceeds to step 1010 for carrying out a regular music data processing routine shown in FIG. 10 to perform a later-mentioned process for registration of the purchase data.

On the other hand, after sound data delivering server 20 has transmitted the trial-listening music data in the aforesaid step 705, sound data delivering server 20 is monitoring whether an instruction for purchasing the regular music data has been received or not in step 710. Therefore, when sound data delivering server 20 has received a data indicating that the user wishes to purchase the regular music data, sound data delivering server 20 determines as "Yes" in step 710 and proceeds to step 715 to determine whether the instruction is for purchase or not in step 715. In this case, sound data delivering server 20 determines as "Yes" in step 715 and proceeds to step 1110 for carrying out a regular music data delivering processing routine shown in FIG. 11 to perform a fee-charging process. Namely, sound data delivering server 20 in step 1110 writes data to that effect into fee-charging database 23 in association with the user that has purchased the music data, and at a predetermined timing, sound data delivering server 20 transmits to fee-charging server 30 a data needed in specifying the user, such as a telephone number or a name as well as a data on the fee (See the arrow (10) of FIG. 5).

On the basis of this data, fee-charging server 30 executes a fee-charging process needed to draw out the fee from a bank account of the user of portable telephone 60. Thereafter, sound data delivering server 20 proceeds to step 455 of FIG. 4 via step 1195 to end the connection with portable telephone 60 and then proceeds to step 495 to end this delivering processing routine.

Figure 10:
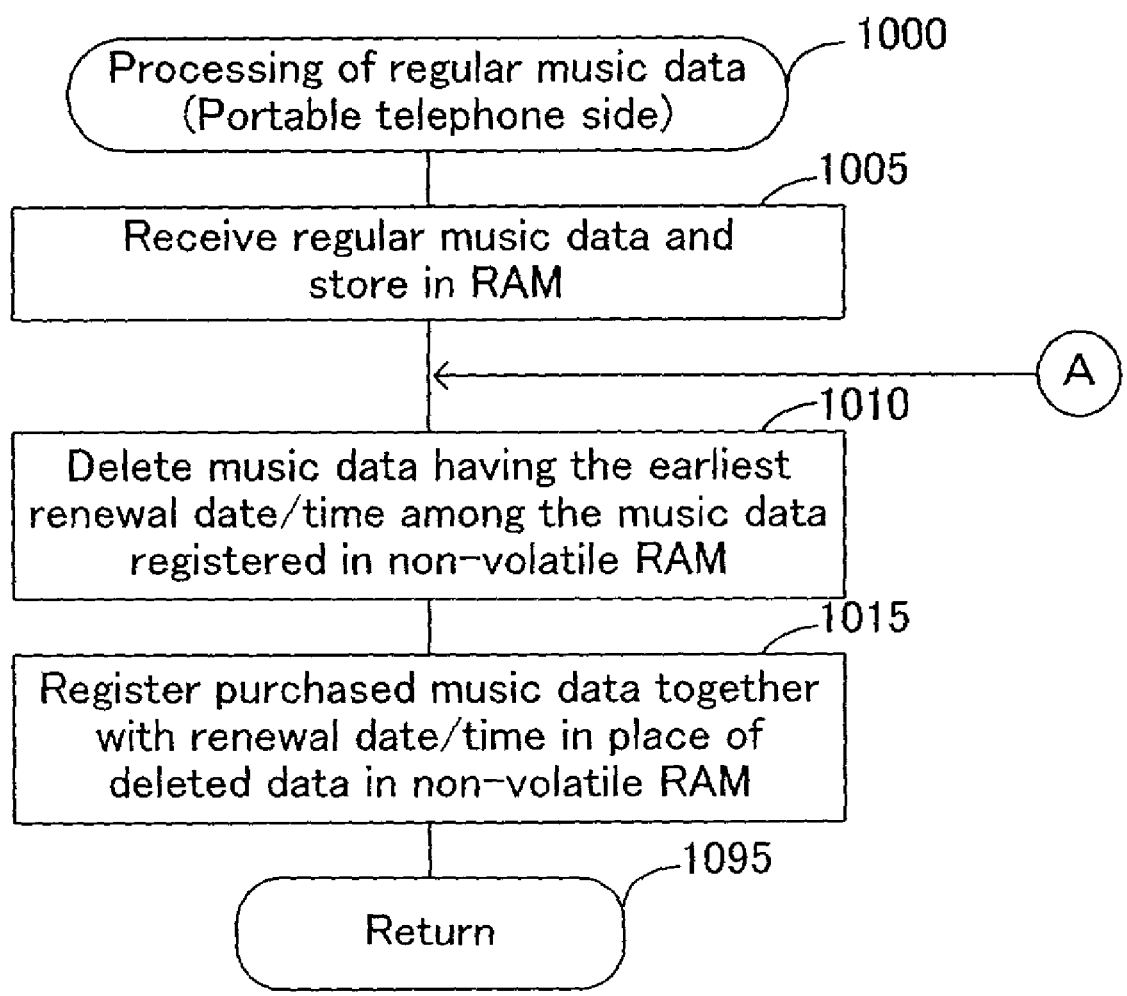
FIG. 10 is a flowchart of a regular music data processing routine executed by a CPU of a portable telephone according to embodiment 1 of the present invention.

Further, portable telephone 60 that has proceeded to step 1010 of FIG. 10 searches for a data having the earliest registration date and time from a plurality of music data registered in an incoming call melody registration area of non-volatile RAM 64 in step 1010, and deletes the data. Subsequently, portable telephone 60 proceeds to step 1015 to register the regular music data now purchased (including the data that has been changed from trial-listening music data to regular music data) in the area where the deleted data was registered, together with the current date and time, and thereafter proceeds to step 395 of FIG. 3 via step 1095. This allows the regular music data now purchased to be one of the registered music data that can be selected by the user of portable telephone 60 as a melody that is reproduced when portable telephone 60 receives a call.

Thus, in processing the trial-listening music data, portable telephone 60 first stores the received trial-listening music data in RAM 63, and sets the number of reproduction times in counter n in step 910. Portable telephone 60 then monitors whether an instruction for reproduction is present or not in step 915, and if the instruction for reproduction has been given, portable telephone 60 proceeds to from step 920 onward to reproduce the trial-listening music data. On the other hand, if the instruction for reproduction is absent, portable telephone 60 monitors whether an instruction for registration is present or not, and if the instruction for registration has been given, portable telephone 60 proceeds to step 940 to notify that the trial-listening music data cannot be registered by displaying comments to that effect on display 72 and issuing a warning sound from sound system 76. Thereafter, portable telephone 60 returns to step 915 again to monitor whether an instruction for reproduction is present or not.

Next, a description will be given on a case in which the user has performed an operation to purchase the regular music data at the time of execution in step 350 of FIG. 3, i.e. in which the wish of the user to purchase the regular music data has been transmitted from portable telephone 60 to sound data delivering server 20 in step 355. In this case, portable telephone 60 and sound data delivering server 20 execute the regular music data processing routines shown in FIG. 10 and in FIG. 11, respectively.

Namely, if sound data delivering server 20 determines that the request from portable telephone 60 is not a request for delivery of a trial-listening music data but is a request for delivery of a regular music data in step 440 of FIG. 4, sound data delivering server 20 proceeds to step 450 to execute a regular music data delivering processing routine. Specifically, starting the process from step 1100 of FIG. 11, sound data delivering server 20 reads out the regular music data corresponding to the selected music from the database 22 of sound data in step 1105 and delivers the regular music data to portable telephone 60. Thereafter, sound data delivering server 20 performs a fee-charging process in the aforesaid step 1110 and returns to step 455 of FIG. 4 via step 1195.

On the other hand, if it is determined that the wish of the user is a purchase of regular music data in step 360 of FIG.

3, portable telephone 60 proceeds to step 370 to start the process of the regular music data processing routine shown in FIG. 10 from step 1000 and, in the subsequent step 1005, receives the regular music data to store the regular music data in RAM 63. Thereafter, in the aforesaid step 1010, portable telephone 60 searches for a music data having the earliest registration date and time from a plurality of music data stored in non-volatile RAM 64 in step 1010, and deletes the data. Subsequently, portable telephone 60 proceeds to step 1015 to register the regular music data received in step 1005 in the area where the deleted data was registered, together with the current date and time, and thereafter proceeds to step 395 of FIG. 3 via step 1095. This allows the regular music data now purchased to be one of the registered music data that can be selected by the user of portable telephone 60 as a melody that is reproduced when portable telephone 60 receives a call. Here, step 1010 may be constructed in such a manner that the user can designate a music data to be deleted, instead of deleting the data having the earliest registration date and time among a plurality of already registered music data.

As described above, according to embodiment 1, the trial-listening music data is delivered to portable telephone 60 without being charged for a fee and can be reproduced for a predetermined number of times in portable telephone 60, thereby providing a service that can satisfy the user while effectively protecting the copyright. Here, the aforesaid step 440 in FIG. 4 constitutes the determining means for determining whether the request from portable telephone 60 is a request of regular music data or a request of a trial-listening music data, and steps 440, 445, and 450 constitute the data delivering means for delivering the data in accordance with the aforesaid request. Further, in the above embodiment, the number of times for permitting reproduction is written in the header of the music data; however, it is not limited thereto, and the system may be constructed in such a manner that, independently of the music data, a data with the recorded number of times for permitting reproduction is received together with (in association with) the aforesaid music data, and a process similar to the above may be executed in accordance with the received data on the number of times for permitting reproduction. It is noted that, if delivering server 20 determines as "No" in step 715, it proceeds to step 455 in FIG. 4 via step 795 for ending the connection to portable telephone 60. It is also noted that portable telephone 60 transmits to sound data delivering server 20 a data indicating that the user does not want to purchase the regular music data in a step between step 970 and step 975, so that sound data delivering server 20 determines as "Yes" in step 710 and as "No" in step 715 to step 455 in FIG. 4 via step 795 for ending the connection to portable telephone 60.

Embodiment 2

Next, embodiment 2 of the sound data delivering system according to the present invention will be described. Embodiment 2 is different from embodiment 1 only in that CPU 61 of portable telephone 60 executes a trial-listening music data processing routine shown in FIGS. 12 and 13 instead of the trial-listening music data processing routine shown in FIG. 9, and in that a reproduction permitting period is written in the header of the trial-listening music data instead of the number of reproduction times. Therefore, the difference from embodiment 1 will be hereafter described with reference to FIGS. 12 and 13.

Figure 3:
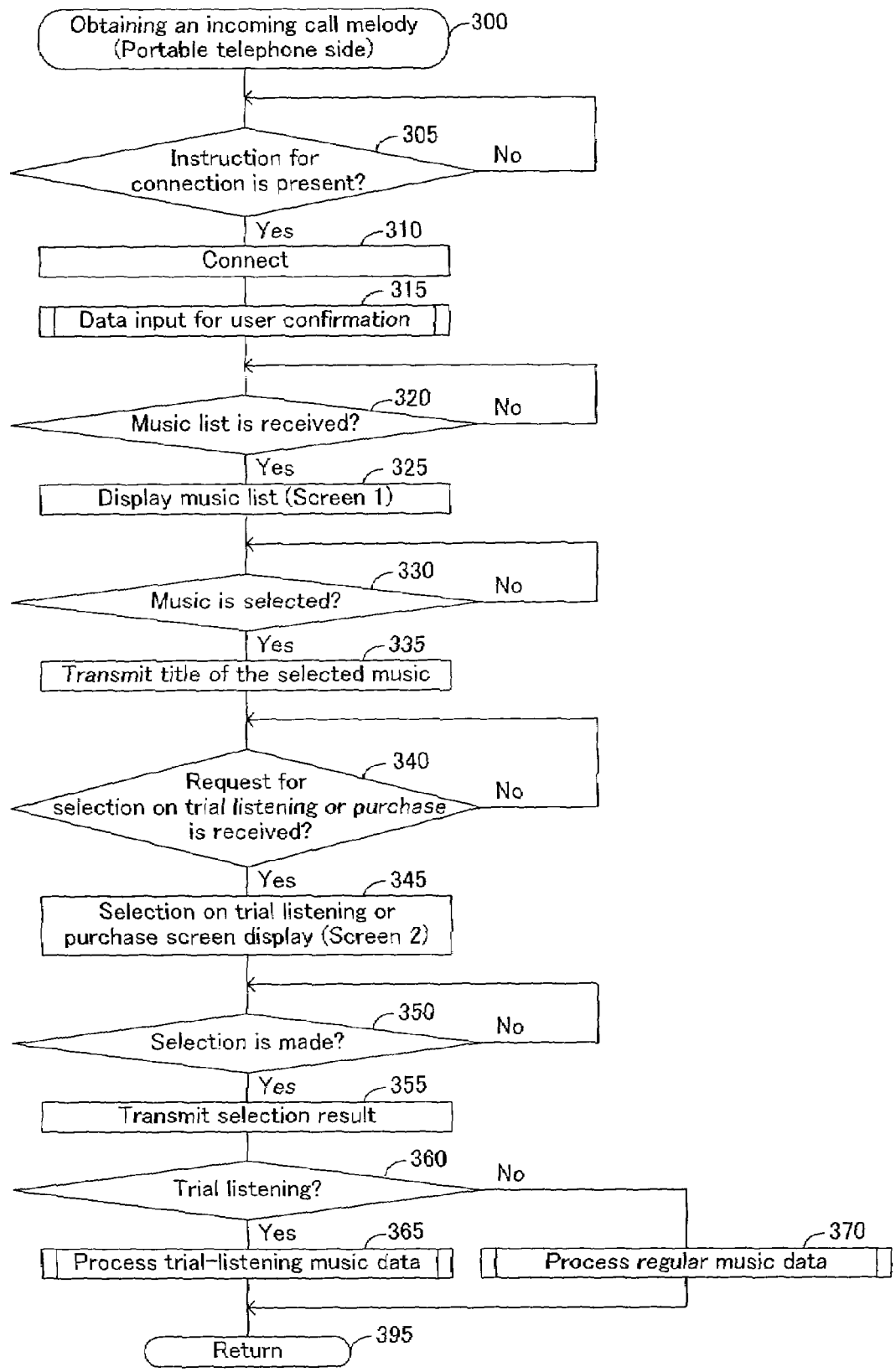
FIG. 3 is a flowchart of an incoming call melody obtaining routine executed by a CPU of a portable telephone according to embodiment 1 of the present invention.

In embodiment 2 also, when the user operates panel operator 70 of portable telephone 60 to enter an incoming call melody obtaining mode, CPU 61 of portable telephone 60 (hereafter simply referred to as "portable telephone 60") executes the program shown in FIG. 3. Therefore, when the user purchases a desired incoming call melody after trial-listening of the melody, portable telephone 60 proceeds to step 365 to execute a trial-listening music data processing routine shown in FIG. 12.

Figure 12:
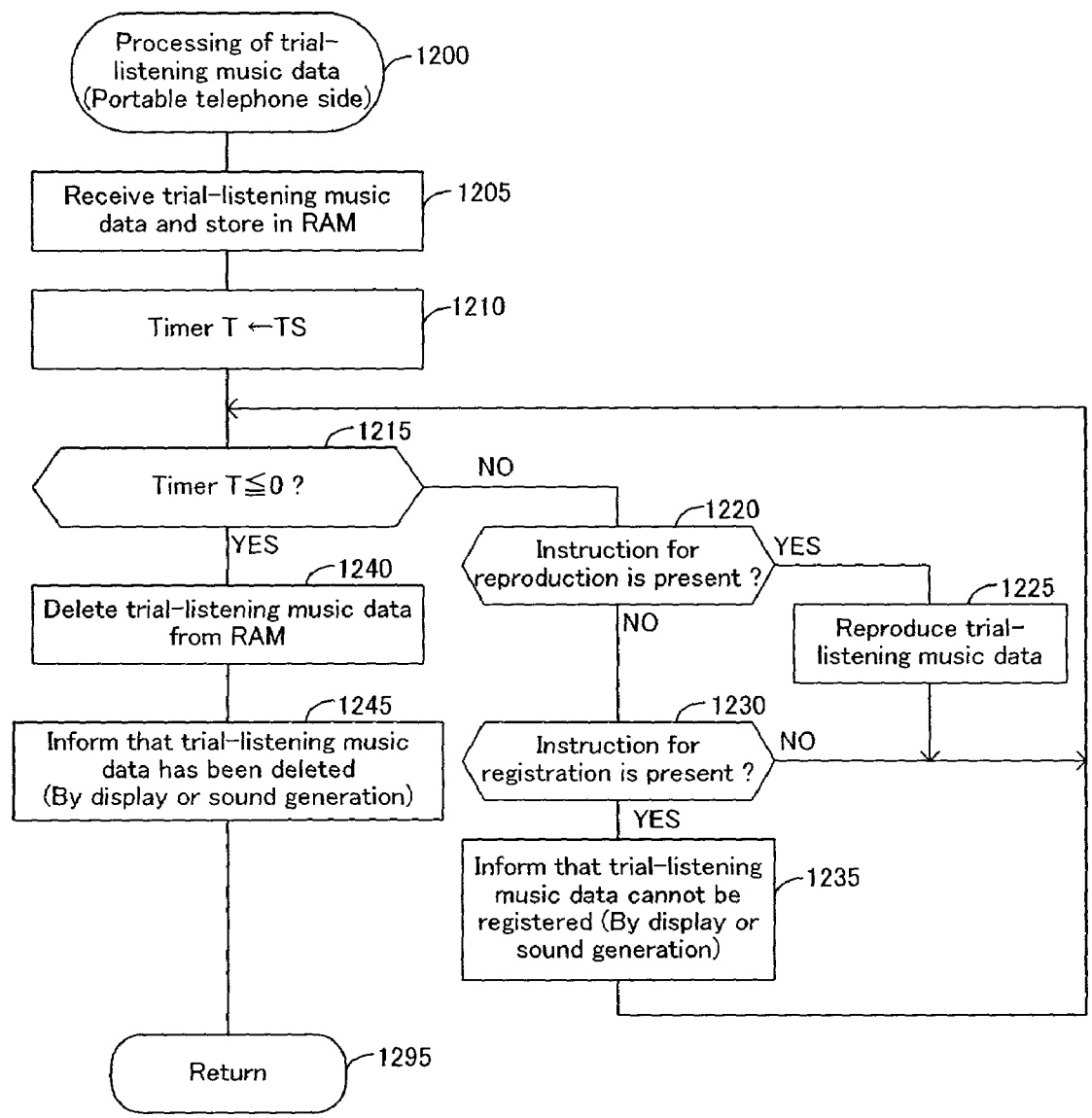
FIG. 12 is a flowchart of a trial-listening music data processing routine executed by a CPU of a portable telephone according to embodiment 2 of the present invention.

Specifically, starting the process from step 1200 of FIG. 12, portable telephone 60 receives the trial-listening music data in step 1205 and stores (memorizes) the received trial-listening music data in RAM 63. As in embodiment 1, this trial-listening music data is transmitted from sound data delivering server 20, and is the same as the regular music data shown in FIG. 8A in that the music data includes four parts and is composed of first to eighth bars, and in that the header having the tone, tempo, and others of each part written therein is disposed before the first bar, as shown in FIG. 8B. On the other hand, the trial-listening music data is different from the regular music data in that a data indicating the initial value TS of a later-mentioned timer T (corresponding to the reproduction permitting period) is written in the header in addition to the tone, tempo, and others of each part.

Referring again to FIG. 12, portable telephone 60 proceeds to step 1210 to set the timer initial period TS (for example, 1 minute), which is written in the header of the trial-listening music data, in the value of timer T, and determines whether or not the value of timer T is smaller than or equal to "0" in step 1215.

Figure 13:
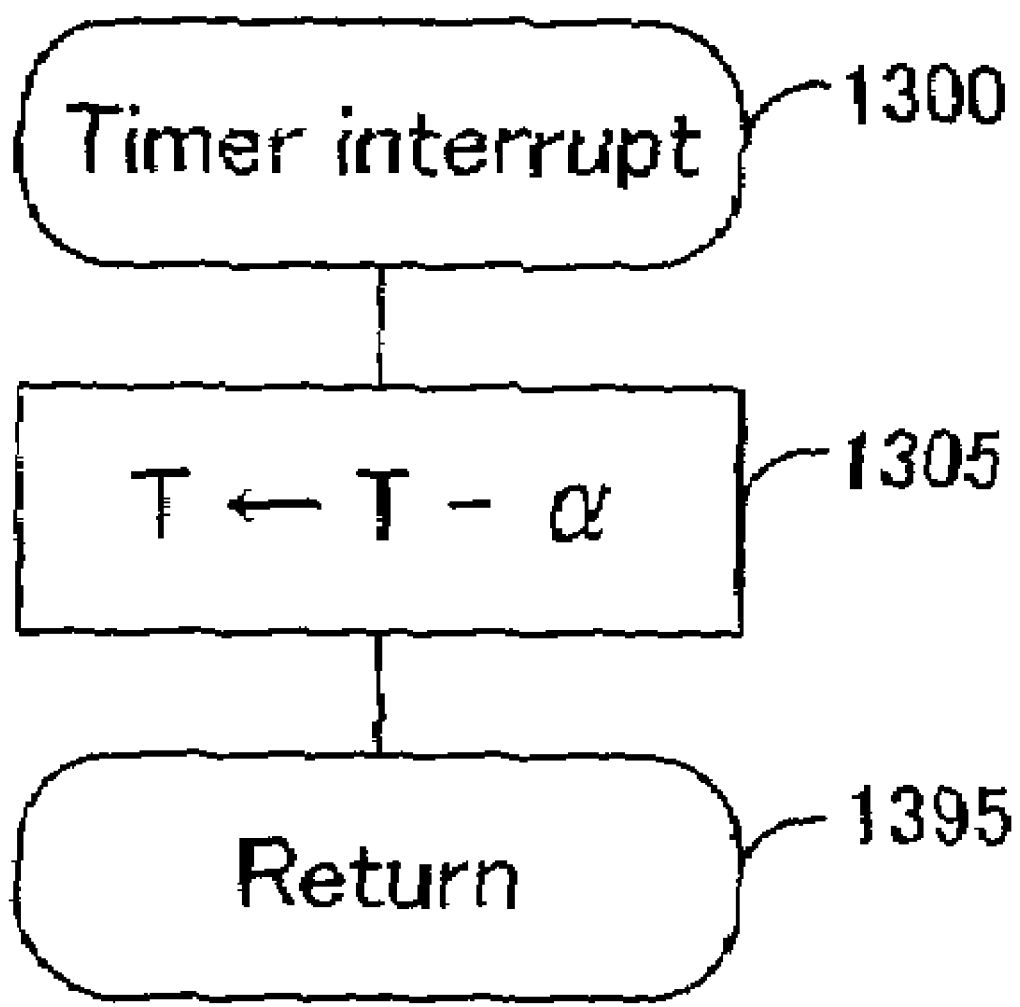
FIG. 13 is a flowchart of a timer interrupt routine executed by a CPU of a portable telephone according to embodiment 2 of the present invention.

The value of this timer T is changed by a timer interrupt processing routine executed every time a predetermined period of time passes, as shown in FIG. 13. Specifically, when this interrupting process is started, (CPU 61 of) portable telephone 60 starts the process from step 1300, decrements the value of timer T by a predetermined positive value α in step 1305, and proceeds to step 1395 to end this interrupt processing routine. This process allows the value of timer T to be decremented by the predetermined value α every time the predetermined period of time passes.

Referring again to FIG. 12, since the current time is immediately after the initial value TS is given to the timer T, portable telephone 60 determines as "No" in step 1215, and proceeds to step 1220 to determine whether an instruction for reproducing the trial-listening music data (instruction for trial listening) by the user is present or not. If the user has instructed to reproduce the trial-listening music data, portable telephone 60 proceeds to step 1225 to reproduce the trial-listening music data with the use of sound source circuit 74, effect circuit 75, and sound system 76. By this process, the user can reproduce the delivered trial-listening music data using sound source circuit 74, effect circuit 75, and sound system 76 of the user's own portable telephone 60, and can determine whether the regular music data should be purchased or not on the basis of the result of reproduction. Thereafter, portable telephone 60 returns to step 1215.

On the other hand, if the instruction for reproduction is absent at the time of execution in the aforesaid step 1220, portable telephone 60 determines as "No" in step 1220, and proceeds to step 1230 to determine whether the user has given an instruction to store (register) the trial-listening music data as an incoming call melody in non-volatile RAM 64. If the instruction for registration is absent at the time of determination in step 1230, portable telephone 60 returns to step 1215.

Further, if the instruction for registration is present at the time of determination in the aforesaid step 1230, portable telephone 60 proceeds to step 1235 to notify that the trial-listening music data cannot be registered as an incoming call melody of portable telephone 60 and that the regular music data must be purchased for registration, by displaying to that effect on display 72 and generating a specific warning sound from sound system 76, and thereafter returns to step 1215.

When such an operation is repeatedly carried out, the value of timer T gradually decreases and, when a predetermined period of time passes, the value of timer T becomes equal to or smaller than "0". As a result of this, portable telephone 60 determines as "Yes" in step 1215, proceeds to step 1240 to delete (erase) the trial-listening music data from RAM 63, and proceeds to step 1245 to notify that the trial-listening music data has been deleted from RAM 63 by displaying comments to that effect on display 72 and issuing a warning sound using sound system 76. Subsequently, portable telephone 60 returns to step 395 of FIG. 3 via step 1295 to end the incoming call melody obtaining mode.

As described above, according to embodiment 2, the trial-listening music data is delivered to portable telephone 60 without being charged for a fee and can be reproduced until a predetermined period of time passes in portable telephone 60, thereby providing a service that can satisfy the user while effectively protecting the copyright. Here, the aforesaid steps 1210, 1215, 1240, and step 1245 constitute the reproduction permitting period limiting means for prohibiting reproduction of the trial-listening music data after a predetermined period of time passes, and also constitute the data erasing means for erasing the trial-listening music data from RAM 63 serving as the storage means after the predetermined period of time passes.

Here, in the aforesaid embodiment 2, the initial value TS is set in timer T when portable telephone 60 receives the trial-listening music data and stores the data in RAM 63, and the trial-listening music data is erased from RAM 63 when a period of time passes, i.e. when the value of timer T becomes equal to or smaller than "0". In other words, in the aforesaid embodiment 2, time count is started at the time point when portable telephone 60 receives the trial-listening music data and stores the data in RAM 63 (i.e. at the time point when the trial-listening music data becomes reproducible), and the trial-listening music data is erased from RAM 63 after a predetermined period of time passes from that time point. However, the time point for starting the time count with the timer may be set at the time point when the reproduction of the trial-listening music data by step 1225 is executed for the first time. Further, in the aforesaid embodiment, the timing for prohibiting the reproduction of the trial-listening music data is identical to the timing of erasing the trial-listening music data; however, the system may be constructed in such a manner that the trial-listening music data is erased after the reproduction of the trial-listening music data is prohibited. In other words, the system may be constructed in such a manner that the trial-listening music data is erased after a period of time passes which is not shorter than the period of time from the start of time count by the timer till the prohibition of reproduction of the trial-listening music data.

Further, in embodiment 2, when the user wishes to register the trial-listening music data as one of the incoming call melodies in non-volatile RAM 64, portable telephone 60 merely notifies that the trial-listening music data cannot be registered (step 1235); however, as in embodiment 1, the user may be prompted to purchase the regular music data, and when an instruction for purchase is given by the user, the data specific to the trial-listening music data (data indicating that the music data is the trial-listening music data as well as the reproduction permitting period) is erased from the header of the trial-listening music data to convert the trial-listening music data into a regular music data for registration as one of the incoming call melodies in non-volatile RAM 64 (or for making the data registrable), and sound data delivering server 20 executes fee-charging on the user. Further, in the above embodiment, the reproduction permitting period is written in the header of the music data; however, it is not limited thereto, and the system may be constructed in such a manner that, independently of the music data, a data with the recorded period for permitting reproduction is received together with (in association with) the aforesaid music data, and a process similar to the above may be executed in accordance with the received data on the reproduction permitting period.

Embodiment 3

Next, embodiment 3 of the sound data delivering system according to the present invention will be described. Embodiment 3 is different from embodiment 1 in that CPU 61 of portable telephone 60 executes a trial-listening music data processing routine shown in FIG. 14 instead of the trial-listening music data processing routine shown in FIG. 9, and in that only the data indicating that the music data is a trial-listening music data is written in the header of the trial-listening music data, in addition to the data written in the header of a regular music data. Therefore, the difference from embodiment 1 will be hereafter described with reference to FIG. 14.

In embodiment 3 also, when the user operates panel operator 70 of portable telephone 60 to enter an incoming call melody obtaining mode, CPU 61 of portable telephone 60 (hereafter simply referred to as "portable telephone 60") executes the program shown in FIG. 3. Therefore, when the user wants to purchase a desired incoming call melody after trial-listening of the melody, portable telephone 60 proceeds to step 365 to execute a trial-listening music data processing routine shown in FIG. 14.

Figure 14:
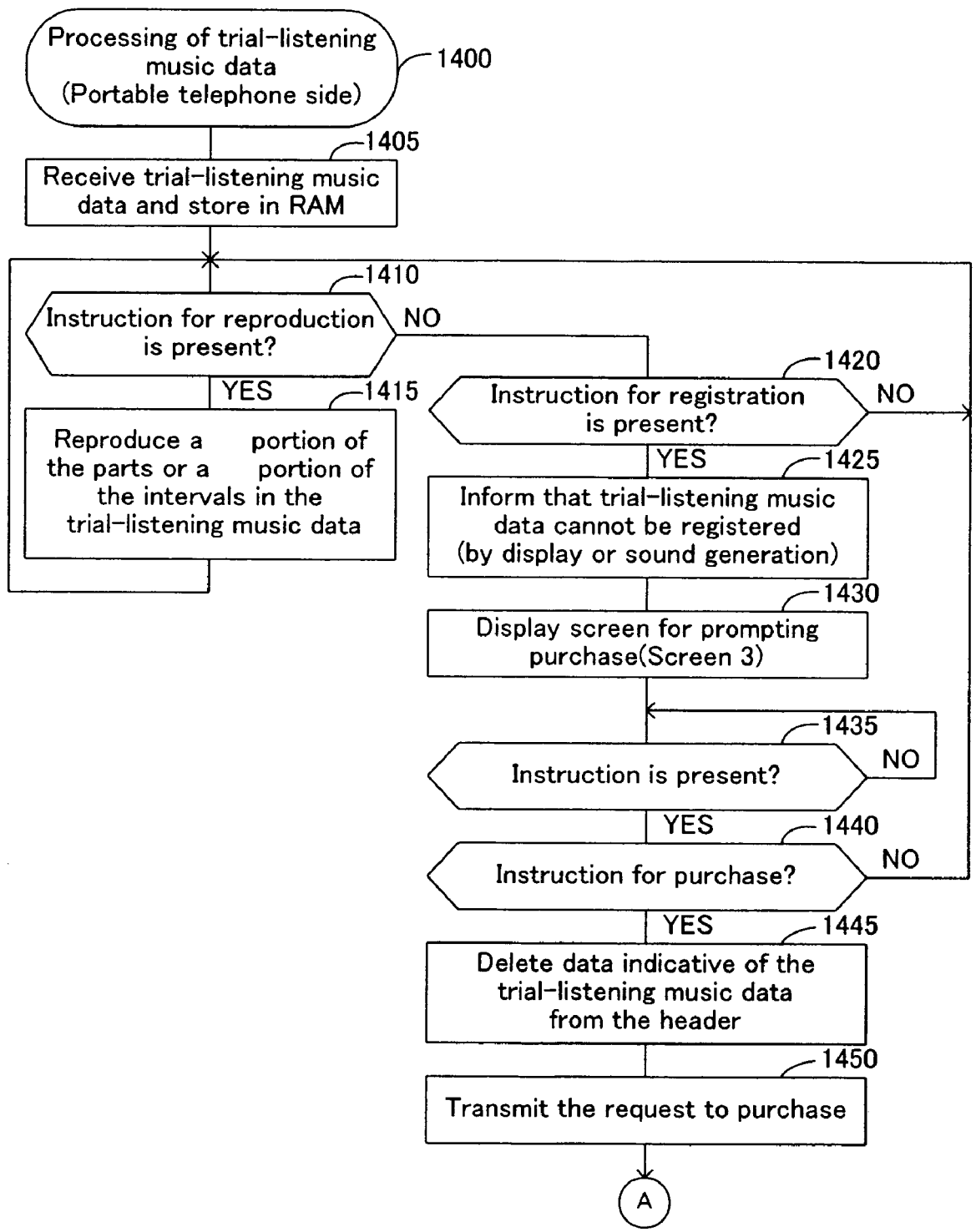
FIG. 14 is a flowchart of a trial-listening music data processing routine executed by a CPU of a portable telephone according to embodiment 3 of the present invention.

Specifically, starting the process from step 1400 of FIG. 14, portable telephone 60 receives the trial-listening music data in step 1405 and stores (memorizes) the received trial-listening music data in RAM 63. This trial-listening music data is transmitted from sound data delivering server 20, and is the same as the regular music data shown in FIG. 8A except that the data indicating that the music data is a trial-listening music data is written in the header of the trial-listening music data, as shown in FIG. 8C.

Portable telephone 60 then proceeds to step 1410 to determine whether an instruction for reproducing the trial-listening music data (instruction for trial listening) by the user is present or not. If the user has instructed to reproduce the trial-listening music data, portable telephone 60 proceeds to step 1415 to reproduce only a portion of the parts of the trial-listening music data or a portion of the intervals such as from the first to fourth bars of the trial-listening music data with the use of sound source circuit 74, effect circuit 75, and sound system 76. More specifically, portable telephone 60 in step 1415 determines whether the music data to be reproduced, which is stored in RAM 63, is a regular music data or a trial-listening music data on the basis of the data written in the header of the music data. In this case, the music data stored in RAM 63 is the one obtained in the previous step 1405 and is a trial-listening music data, so that portable telephone 60 partially reproduces the music data in step 1415.

By this process, the user can reproduce, though only partially, the music data identical to the delivered regular music data with using sound source circuit 74, effect circuit 75, and sound system 76 of the user's own portable telephone 60, and can determine whether the regular music data should be purchased or not on the basis of the result of reproduction. Thereafter, portable telephone 60 returns to step 1410.

On the other hand, if the instruction for reproduction is absent at the time of execution in the step 1410, portable telephone 60 proceeds to step 1420 to determine whether the user has given an instruction to store (register) the trial-listening music data as an incoming call melody in non-volatile RAM 64. If the instruction for registration is absent at the time of determination in step 1420, portable telephone 60 returns to step 1410 to determine again whether the instruction for reproduction is present or not.

Further, if the instruction for registration is present at the time of determination in the aforesaid step 1420, portable telephone 60 proceeds to step 1425 to notify that the trial-listening music data cannot be registered as an incoming call melody of portable telephone 60, by displaying comments to that effect on display 72 and generating a specific warning sound from sound system 76. Portable telephone 60 then proceeds to step 1430 to display a screen for confirming whether the user wishes to purchase the regular music data corresponding to the trial-listening music data (See screen 3 in FIG. 6C).

Portable telephone 60 then waits for an instruction for "purchasing" or "not purchasing" the regular music data in step 1435, and if an instruction has been given, portable telephone 60 proceeds to step 1440 to determine whether the instruction is an instruction for purchasing the regular music data or not. If the given instruction is an instruction for purchase, portable telephone 60 proceeds to step 1445 to erase the data indicating that the music data is a trial-listening music data, which is written in the header of the trial-listening music data, thereby to change the trial-listening music data to the regular music data. Portable telephone 60 then proceeds to step 1450 to transmit to sound data delivering server 20 a data indicating that the user wishes to purchase the regular music data. Thereafter, portable telephone 60 proceeds to from step 1010 onward for carrying out the regular music data processing routine shown in FIG. 10 to perform the aforementioned process for registration of the purchase data. Here, in this case, sound data delivering server 20 is executing step 710 of the trial-listening music data delivering processing routine of FIG. 7 in the same manner as in embodiment 1. Therefore, when sound data delivering server 20 receives the aforesaid instruction for purchase, sound data delivering server 20 determines as "Yes" in step 710 and step 715, and proceeds to step 1110 of FIG. 11 to carry out a process of fee-charging on the user of portable telephone 60.

As described above, according to embodiment 3, the trial-listening music data identical to the regular music data is delivered, as a music data needed for generation of a sound, to portable telephone 60 without being charged for a fee, and the trial-listening music data is partially reproduced in portable telephone 60, thereby providing a service that can satisfy the user while effectively protecting the copyright.

Here, in embodiment 3, the data indicating that the music data is a trial-listening music data is written in the header of the trial-listening music data; however, in addition to this or instead of this, the system may be constructed in such a manner that a data indicating that the music data is a regular music data is written in the header of the regular music data. In this case, the system may be constructed in such a manner that, when portable telephone 60 determines that the instruction for reproduction is present in step 1410, portable telephone 60 determines whether the music data stored in RAM 63 is a trial-listening music data or not in step 1415 on the basis of whether the data indicating the regular music data is present or not. Further, if the data indicating the trial-listening music data is written in the header of the trial-listening music data, portable telephone 60 is constructed to erase the data indicating the trial-listening music data from the header of the music data stored in RAM 63 in step 1445, and to write into the header the data indicating that the music data is a regular music data. Here, in the above, the data indicating the trial-listening data is written in the header of the music data; however, it is not limited thereto, and the system may be constructed in such a manner that, independently of the music data, a data indicating that the music data is for trial listening is received together with (in association with) the music data, and a process similar to the above may be executed in accordance with the received data indicating that the music data is for trial listening. Further, in embodiment 3 also, the system may be constructed in such a manner that the trial-listening music data is erased after reproduction is carried out for a predetermined number of times or after a predetermined period of time passes as in embodiment 1 or 2, and in that case, the user is prompted to purchase the regular music data.

Embodiment 4

Next, embodiment 4 of the sound data delivering system according to the present invention will be described. Embodiment 4 is different from embodiment 1 in that CPU 61 of portable telephone 60 executes a trial-listening music data processing routine shown in FIG. 15 instead of the trial-listening music data processing routine shown in FIG. 9, in that sound data delivering server 20 executes a trial-listening music data delivering processing routine shown in FIG. 16 instead of the trial-listening music data delivering processing routine shown in FIG. 7, and in that the trial-listening data itself is made of a a portion of the regular music data instead of writing the number of reproduction times in the header of the trial-listening music data. Therefore, the difference from embodiment 1 will be hereafter described mainly with reference to FIGS. 15 and 16.

In embodiment 4 also, when the user operates panel operator 70 of portable telephone 60 to enter an incoming call melody obtaining mode, CPU 61 of portable telephone 60 (hereafter simply referred to as "portable telephone 60") executes the program shown in FIG. 3. Therefore, when the user purchases a desired incoming call melody after trial-listening of the melody, portable telephone 60 transmits a request for delivery of a specific trial-listening music data to sound data delivering server 20 in steps 335, 355, and proceeds to step 365 to execute a trial-listening music data processing routine shown in FIG. 15.

At this time, sound data delivering server 20 is executing step 440 of FIG. 4. Therefore, upon receiving the request for delivery of the specific trial-listening music data from portable telephone 60, sound data delivering server 20 determines as "Yes" in step 440 and proceeds to step 445 to execute a trial-listening music data delivering processing routine shown in FIG. 16. Specifically, sound data delivering server 20 starts the process from step 1600 and proceeds to step 1605 to execute the delivery of the trial-listening music data corresponding to the music specified (selected) by the user.

Figure 15:
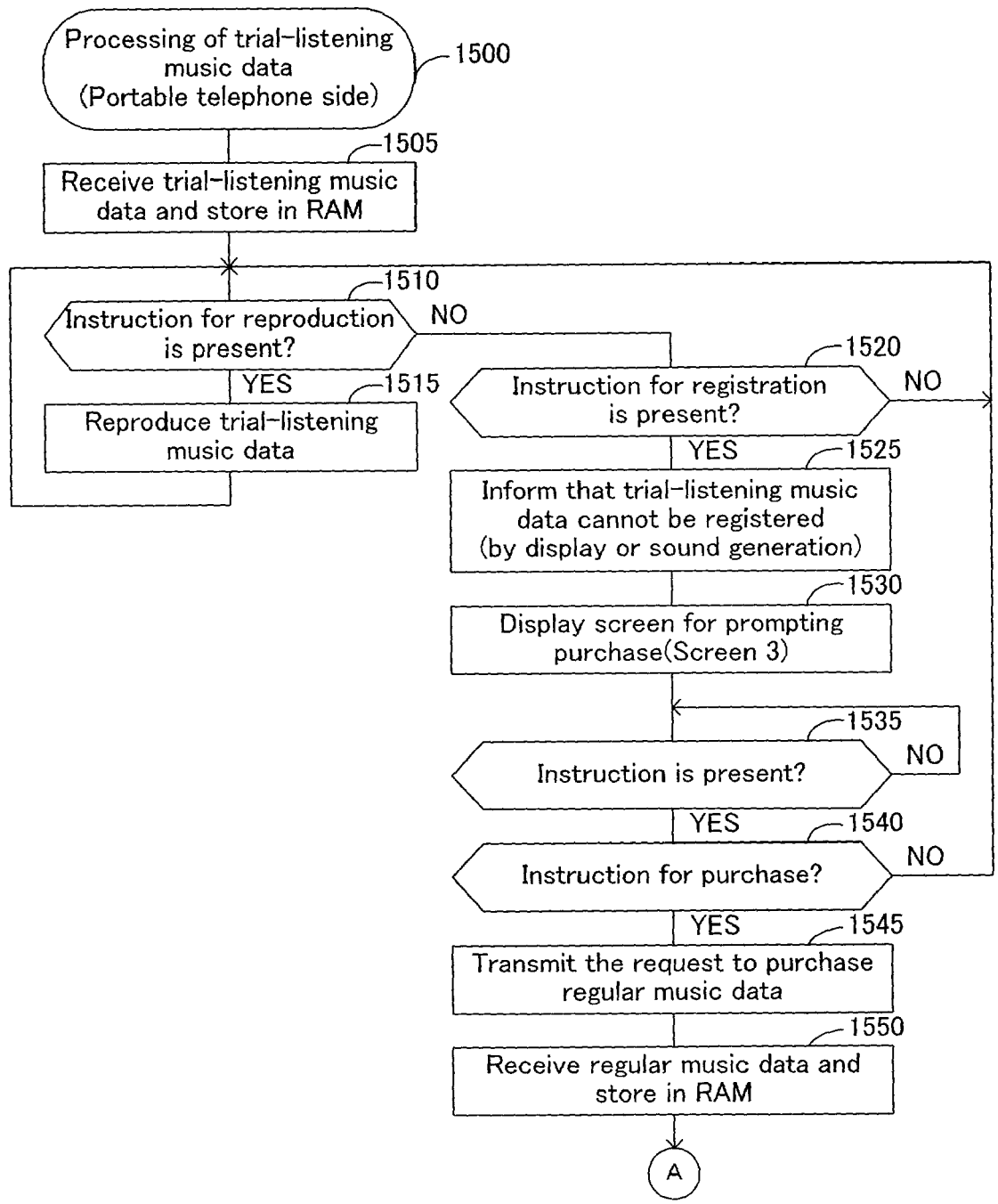
FIG. 15 is a flowchart of a trial-listening music data processing routine executed by a CPU of a portable telephone according to embodiment 4 of the present invention.

On the other hand, portable telephone 60 starts the process from step 1500 of FIG. 15, receives the trial-listening music data in step 1505, and stores (memorizes) the received trial-listening music data in RAM 63. In this example, the regular music data includes four parts and is composed of the first to eighth bars, as shown in FIG. 8A, and the aforesaid trial-listening music data includes four parts identical to the parts of the regular music data and is composed of the first to fourth bars, as shown in FIG. 8D. In other words, the trial-listening music data is composed of a portion of the length of the regular music data (data obtained by taking a portion out of the intervals of the regular music data).

Portable telephone 60 then proceeds to step 1510 to determine whether an instruction for reproducing the trial-listening music data (instruction for trial listening) by the user is present or not. If the user has instructed to reproduce the trial-listening music data, portable telephone 60 proceeds to step 1515 to reproduce the trial-listening music data with the use of sound source circuit 74, effect circuit 75, and sound system 76. In this case, since the trial-listening music data is only a portion of the regular music data, the reproduced music is also a portion of the regular music. However, the user can really reproduce a portion of the music data, which the user is considering to purchase, using sound source circuit 74, effect circuit 75, and sound system 76 of the user's own portable telephone 60, 50 that the user can properly determine whether the regular music data should be purchased or not on the basis of the result of reproduction. Thereafter, portable telephone 60 returns to step 1510 to monitor again whether the instruction for reproduction is present or not.

On the other hand, if the instruction for reproduction is absent at the time of execution in step 1510, portable telephone 60 proceeds to step 1520 to determine whether the user has given an instruction to store (register) the trial-listening music data as an incoming call melody in non-volatile RAM 64. If the instruction for registration is absent at the time of determination in step 1520, portable telephone 60 returns to step 1510 to determine again whether the instruction for reproduction is present or not.

Further, if the instruction for registration is present at the time of determination in the aforesaid step 1520, portable telephone 60 proceeds to step 1525 to notify that the trial-listening music data cannot be registered as an incoming call melody of portable telephone 60, by displaying comments to that effect on display 72 and generating a specific warning sound from sound system 76. Portable telephone 60 then proceeds to step 1530 to display a screen for confirming whether the user wishes to purchase the regular music data corresponding to the trial-listening music data (See screen 3 in FIG. 6C).

Portable telephone 60 then waits for an instruction for "purchasing" or "not purchasing" the regular music data in step 1535, and if an instruction has been given, portable telephone 60 proceeds to step 1540 to determine whether the instruction is an instruction for purchasing the regular music data or not. If the given instruction is an instruction for purchase, portable telephone 60 proceeds to step 1545 to transmit to sound data delivering server 20 the instruction (request) of the user to purchase the regular music data.

Figure 11:
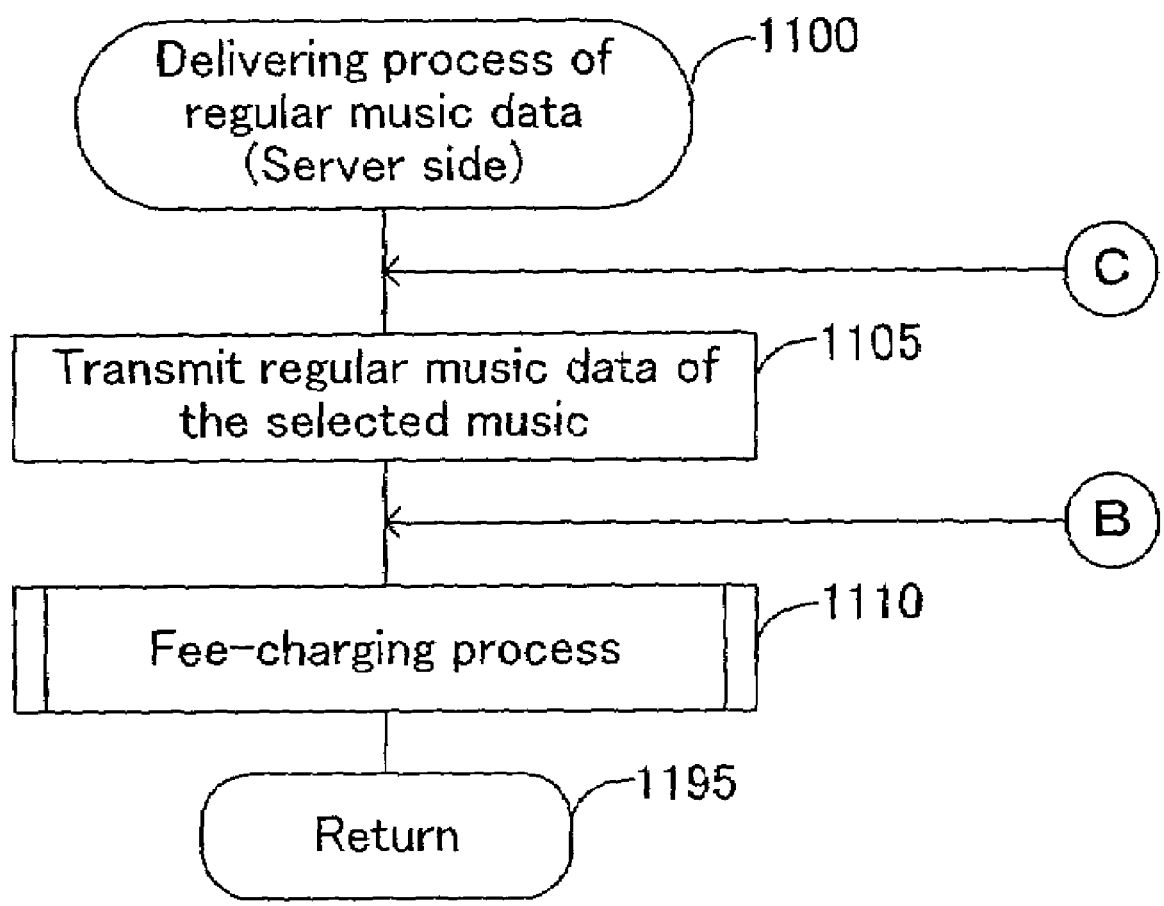
FIG. 11 is a flowchart of a regular music data delivering process routine executed by a sound data delivering server according to embodiment 1 of the present invention.
Figure 16:
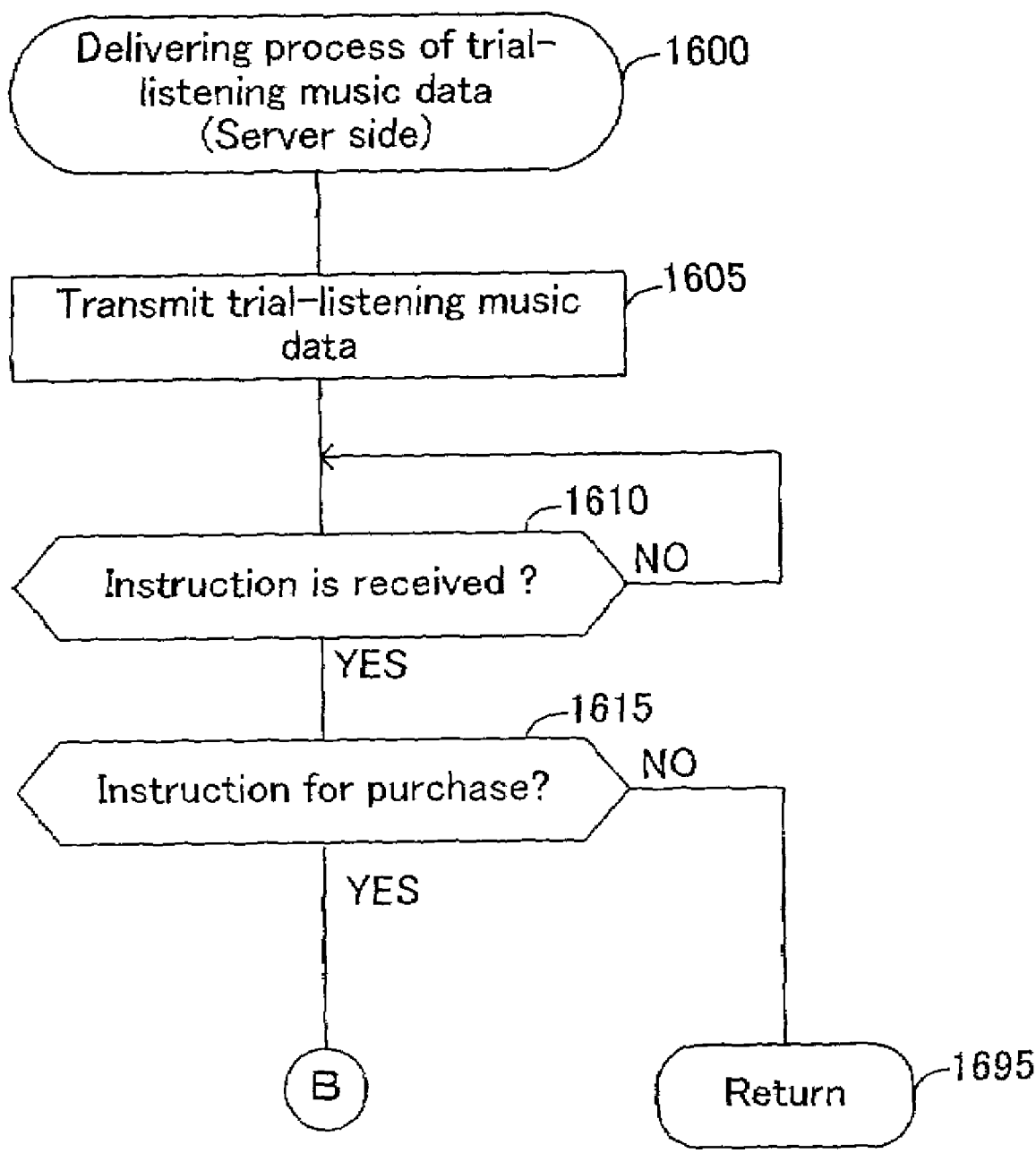
FIG. 16 is a flowchart of a trial-listening music data delivering process routine executed by a sound data delivering server according to embodiment 4 of the present invention.

At this time, since sound data delivering server 20 is executing step 1610 of the trial-listening music data delivering processing routine of FIG. 16, sound data delivering server 20 determines as "Yes" in step 1610 to proceed to step 1615, and also determines as "Yes" in step 1615 to proceed to step 1105 of the regular music data delivering processing routine shown in FIG. 11, where sound data delivering server 20 transmits the regular music data of the selected music to portable telephone 60 and performs the aforementioned fee-charging process in the subsequent step 1110.

Then, portable telephone 60 in step 1550 receives the regular music data and proceeds to from step 1010 and onward of the regular music data processing routine shown in FIG. 10 to perform the aforementioned process of registering the purchase data.

(Modification of Embodiment 4)

In the aforesaid embodiment 4, the regular music data includes four parts and is composed of the first to eighth bars, while the trial-listening music data includes four parts and is composed of the first to fourth bars. In contrast, in a modification of embodiment 4, the regular music data includes four parts and is composed of the first to eighth bars, while the trial-listening music data is composed of the first to eighth bars constructed with only one part of the four parts of the regular music data, as shown in FIG. 8E. The other features are the same as in embodiment 4. Here, it should be understood that the trial-listening music data can be constructed with a smaller number of parts than the number of parts constituting the regular music data. That is, the trial-listening music data need not be constructed with only one part as described above.

This allows that, when portable telephone 60 reproduces the trial-listening music data in step 1515, only one part of the plurality of parts constituting the regular music data is reproduced though having the same length as the regular music data, and the user can consider whether or not to purchase the regular music data on the basis of the result of this reproduction. It should be noted that, as in the aforesaid embodiment 4, the trial-listening music data cannot be registered as an incoming call melody.

As described above, according to embodiment 4 and its modification, the trial-listening music data composed of a portion of the regular music data is delivered to portable telephone 60 without being charged for a fee, and can be reproduced in portable telephone 60, thereby providing a service that can satisfy the user while effectively protecting the copyright.

Embodiment 5

Next, embodiment 5 of the sound data delivering system according to the present invention will be described. Embodiment 5 is different from embodiment 1 in that CPU 61 of portable telephone 60 executes a trial-listening music data processing routine shown in FIG. 17 instead of the trial-listening music data processing routine shown in FIG. 9, in that sound data delivering server 20 executes a trial-listening music data delivering processing routine shown in FIG. 18 instead of the trial-listening music data delivering processing routine shown in FIG. 7, and in that the trial-listening data is completely identical to the regular music data but is stream-delivered (delivered through streaming) to portable telephone 60. Therefore, the difference from embodiment 1 will be hereafter described mainly with reference to FIGS. 17 and 18.

In embodiment 5 also, when the user operates panel operator 70 of portable telephone 60 to enter an incoming call melody obtaining mode, CPU 61 of portable telephone 60 (hereafter simply referred to as "portable telephone 60")

executes the program shown in FIG. 3. Therefore, when the user purchases a desired incoming call melody after trial-listening of the melody, portable telephone 60 transmits to sound data delivering server 20 a data specifying the desired music in step 335 and transmits to sound data delivering server 20 a data indicating that the user wishes trial listening in step 355. Thereafter, portable telephone 60 proceeds to step 365 to execute a trial-listening music data processing routine shown in FIG. 17.

Figure 18:
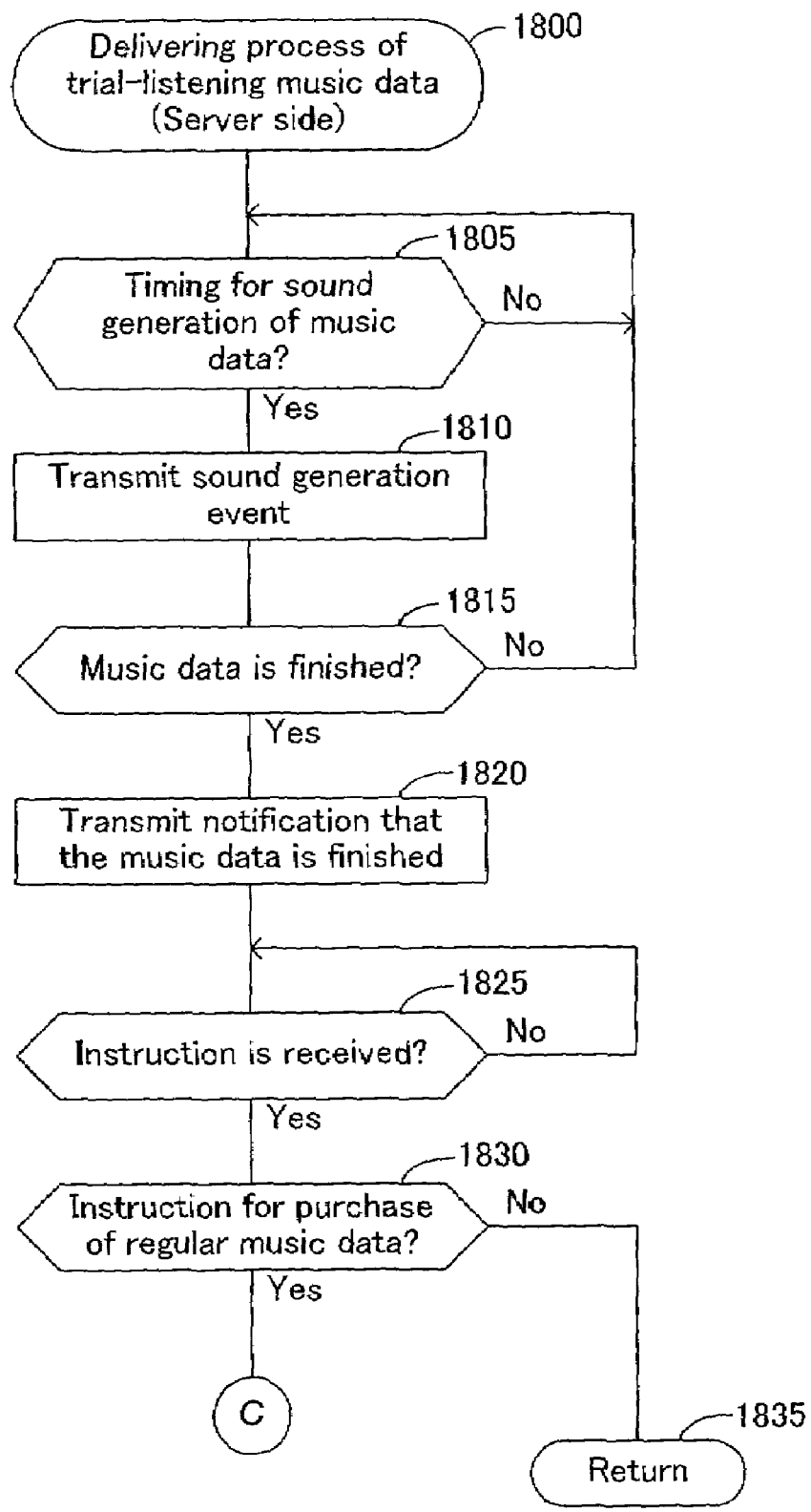
FIG. 18 is a flowchart of a trial-listening music data delivering process routine executed by a sound data delivering server according to embodiment 5 of the present invention.

At this time, sound data delivering server 20 has started the trial-listening music data delivering process of FIG. 18 from step 1800, and monitors whether the timing of generating a sound in accordance with the trial-listening music data (in this embodiment, since the trial-listening music data is identical to the regular music data, both data will be hereafter simply referred to as music data) has arrived or not in step 1805.

By this process, when the timing of generating a sound in accordance with the music data arrives, sound data delivering server 20 determines as "Yes" in step 1805, and proceeds to step 1810 to transmit the sound generation event (information needed for portable telephone 60 to generate a new sound), and thereafter determines whether the music data has ended or not in step 1815. If the music data has not ended, sound data delivering server 20 determines as "No" in step 1815 and returns to step 1805 to wait for the arrival of the next sound generation timing. By the above process, sound data delivering server 20 transmits the sound generation event to portable telephone 60 (by packet communication) every time the sound generation timing arrives until the music data ends. In other words, sound data delivering server 20 stream-delivers the music data to portable telephone 60. Further, when the music data to be delivered ends, sound data delivering server 20 determines as "Yes" in step 1815, and proceeds to step 1820 to transmit to portable telephone 60 a data indicating that the music data has ended.

Figure 17:
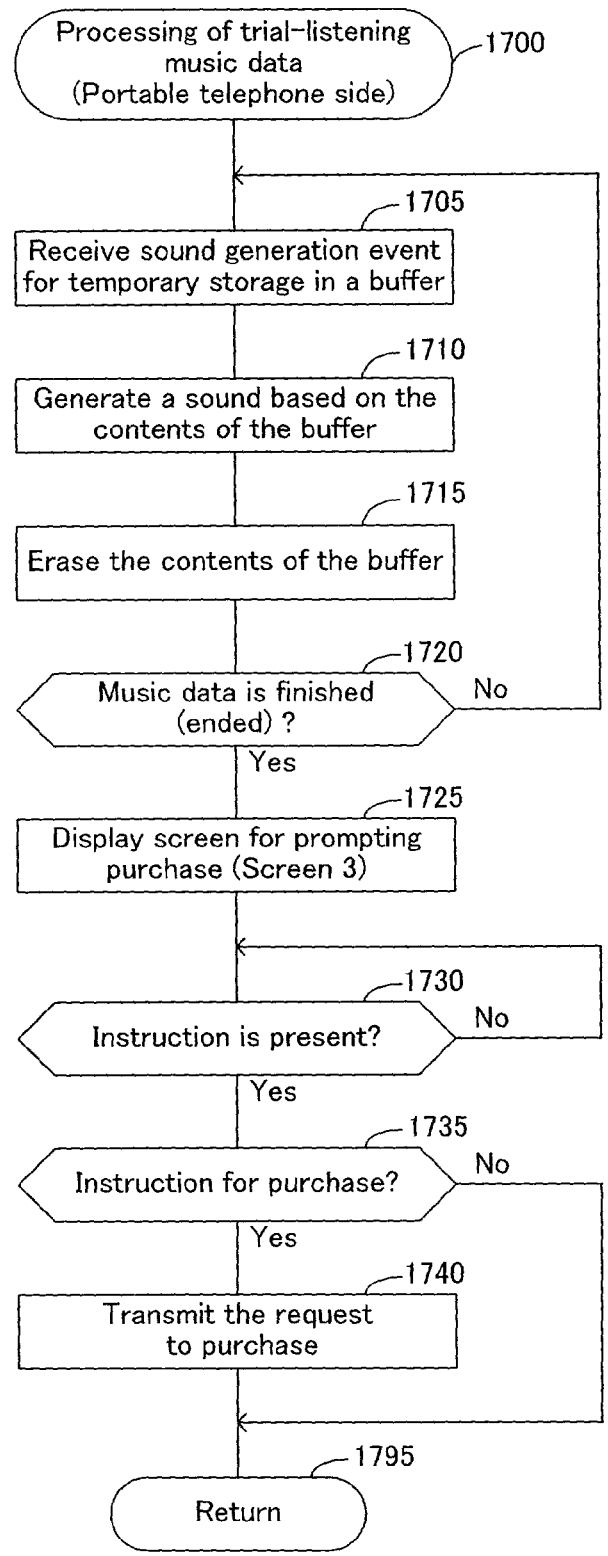
FIG. 17 is a flowchart of a trial-listening music data processing routine executed by a CPU of a portable telephone according to embodiment 5 of the present invention.

On the other hand, portable telephone 60 in step 1705 of FIG. 17 temporarily stores in a buffer (which may be RAM 63) the sound generation event transmitted from sound data delivering server 20, and generates a sound in accordance with the contents stored in the buffer in step 1710. Then, portable telephone 60 immediately erases the contents of the buffer in step 1715, and proceeds to step 1720 to determine whether the music data has ended or not on the basis of whether the data, transmitted from sound data delivering server 20, indicating the music data has ended is present or not. If the music data has not ended, portable telephone 60 determines as "No" in step 1720 and returns to step 1705, whereas if the music data has ended, portable telephone 60 determines as "Yes" in step 1720 to proceed to step 1725.

As a result of this, portable telephone 60 successively reproduces the music data stream-delivered from sound data delivering server 20 with the use of sound source circuit 74, effect circuit 75, and sound system 76. Therefore, the user can confirm how the music data is actually reproduced by the user's own portable telephone 60, and can properly determine whether the regular music data should be purchased or not on the basis of the result of reproduction.

When the stream-delivered music data has ended, portable telephone 60 proceeds to step 1725 to display a screen for confirming whether the user wishes to purchase the selected music data (See screen 3 in FIG. 6C). Portable telephone 60 then waits for an instruction for "purchasing" or "not purchasing" the regular music data in step 1730, and if an instruction has been given by the user, portable telephone 60 proceeds to step 1735 to determine whether the instruction is an instruction for purchasing the regular music data or not. If the given instruction is an instruction for purchase, portable telephone 60 proceeds to step 1740 to transmit to sound data delivering server 20 the instruction (request) of the user to purchase the music data, and thereafter returns to step 395 of FIG. 3 via step 1795. If the above instruction is not an instruction for purchase of the regular music data, portable telephone 60 proceeds from step 1735 directly to step 1795 and returns to step 395 of FIG. 3.

At this time, sound data delivering server 20 is executing step 1825 in the trial-listening music data delivering processing routine of FIG. 18. For this reason, if the above instruction from portable telephone 60 is an instruction for purchase, sound data delivering server 20 determines as "Yes" in step 1825 to proceed to step 1830 and determines also as "Yes" in step 1830 to proceed to step 1105 of the regular music data delivering processing routine shown in FIG. 11, where sound data delivering server 20 transmits the regular music data of the selected music to portable telephone 60 in step 1105 and performs the above-described fee-charging process in the subsequent step 1110.

On the other hand, if the above instruction from portable telephone 60 is not an instruction for purchase, sound data delivering server 20 determines as "Yes" in step 1825 and thereafter determines as "No" in step 1830 to proceed to from step 445 and onward shown in FIG. 4 via step 1835.

Thus, in embodiment 5, as in other embodiments, the regular music data delivered to portable telephone 60 by sound data delivering server 20 in accordance with the request from portable telephone 60 are all stored for a time in RAM 63 of portable telephone 60, and thereafter registered as an incoming call melody in non-volatile RAM 64. In contrast, regarding the trial-listening music data, every time a sound generation event arrives, data needed for sound generation event is sequentially delivered from sound data delivering server 20 to portable telephone 60, whereby portable telephone 60 generates a sound every time the data is delivered. At this time, portable telephone 60 does not keep the trial-listening music data in RAM 63, so that the trial-listening music data automatically disappears (is erased) from portable telephone 60, and therefore cannot be registered as an incoming call melody in non-volatile RAM 64.

As described above, according to embodiment 5, the trial-listening music data is stream-delivered to portable telephone 60 without being charged for a fee, and is successively (every time the sound generation event arrives, for every delivery) reproduced in portable telephone 60, and the delivered trial-listening music data is erased from portable telephone 60, thereby providing a service that can satisfy the user while effectively protecting the copyright. It is noted that, the trial-listening music data stream-delivered in embodiment 5 may be a portion of the regular music data as in embodiment 4. Further, in the above, sound data delivering server 20 delivers a packeted data for each sound generation event in stream-delivering the sound generation event, however, it is not limited thereto, and the system may be constructed in such a manner that a plurality of sound generation events having a sound generation time close to each other are packeted. The packeted data may include the data on the sound generation time difference of each event. In this case, the plurality of events included in one packet, received by portable telephone 60, are sequentially reproduced in accordance with the data on the sound generation time difference.

As described above, in each embodiment according to the present invention, a request of delivery of a trial-listening music data or a regular music data on the music that the user wishes to obtain is transmitted from portable telephone 60 to sound data delivering server 20, whereby sound data delivering server 20 delivers the music data corresponding to the request to portable telephone 60. Further, sound data delivering server 20 charges a fee to the user of portable telephone 60 located at the destination of delivery in delivering the regular music data, and does not charge a fee to the user in delivering the trial-listening music data. This allows the user to obtain, free of charge, the trial-listening music data corresponding to the music data which the user is considering to purchase, and to actually reproduce (generating a sound in accordance with) the trial-listening music data with the user's own portable telephone 60. As a result, the service provided by this sound data delivering system will be satisfactory to the user of the portable telephone.

Moreover, in each of the above embodiments, the delivered music data can be registered as an incoming call melody in non-volatile RAM 64 only if an instruction for purchasing the music data is transmitted. This can effectively protect the copyright of the delivered music data. It should be noted that, in each of the above embodiments, the user of portable telephone 60 can select and set a music data, which is to be used for generation of a sound on receiving a call, from among a plurality of music data registered as incoming call melodies in non-volatile RAM 64.

It should be noted that, the present invention is not limited to the above-described embodiments, and various modifications can be made within the scope of the present invention. For example, in each of the above embodiments, the regular music data is automatically registered as an incoming call melody in non-volatile RAM 64 simultaneously with the purchase of the regular music data. Alternatively, however, the regular music data may be registered as an incoming call melody in non-volatile RAM 64 when an instruction for registration is further provided by the user after the regular music data is obtained (after the regular music data is stored in RAM 63).

Also, in each of the above embodiments, sound data delivering server 20 does not charge a fee to the user in delivering the trial-listening music data. Alternatively, however, the system may be constructed in such a manner that, in delivering a trial-listening music data, sound data delivering server 20 charges a fee smaller than the fee charged for delivering the regular music data. For example, in a specific-fee system, the trial-listening music data may have half the price of the regular music data, or in a fixed-fee system, the trial-listening music data may be counted as a 0.5 music piece of the regular music data.

What is claimed is:

1. A sound data delivering system having a portable communication terminal and a delivering server that are communicable with each other, said delivering server comprising:
   request determining means for determining whether a request from said portable communication terminal is a request of a regular sound data or a request of a trial-listening sound data; and
   data delivering means for delivering the regular sound data to the portable communication terminal with charging a fee to a user of the portable communication terminal if the request from said portable communication terminal is determined to be a request of said regular sound data, and for delivering a trial-listening sound data, which is the regular sound data to which an appending data indicating that the sound data is the trial-listening sound data is added in order to generate the trial-listening sound data, to the portable communication terminal without charging a fee to the user of the portable communication terminal if the request from the portable communication terminal is determined to be a request of said trial-listening sound data, and
said portable communication terminal comprising:
   storage means for storing said delivered regular sound data and said delivered trial-listening sound data; and
   registration means for, if the sound data stored in said storage means is a regular sound data, registering the sound data as a sound data of an incoming call sound or a background music of said portable communication terminal, or, if the sound data is a trial-listening sound data, refraining from registering the trial-listening sound data as a sound data of an incoming call or a background music of said portable communication terminal,
   wherein the registration mean is configured to alter the sound data stored in said storage means as the trial-listening sound data from the trial-listening sound data to the regular sound data by erasing said appending data from the sound data and to permit registration of the altered trial-listening sound data if an instruction for purchasing the trial-listening sound data is transmitted from said portable communication terminal to said server.

2. The sound data delivering system according to claim 1, wherein said delivering server further comprises means for charging a fee to a user of the portable communication terminal if the instruction for purchasing the trial-listening sound data is transmitted from said portable communication terminal to said server.

3. The sound data delivering system according to claim 1, wherein said portable communication terminal further comprises means for notifying the user of the portable communication terminal that the trial-listening sound data cannot be registered as a sound data of an incoming call or a background music of said portable communication terminal, when an input operation for registering the trial-listening sound data as an incoming call sound or a background music is performed.

4. The sound data delivering system according to claim 3, wherein said portable communication terminal further comprises means for notifying the user of the portable communication terminal that the trial-listening sound data cannot be registered as a sound data of an incoming call or a background music of said portable communication terminal, when an input operation for registering the trial-listening sound data as an incoming call sound or a background music is performed.

5. A sound data delivering method using a portable communication terminal and a delivering server that are communicable with each other so as to deliver a sound data from the delivering server to the portable communication terminal, comprising steps of:
   delivering a regular sound data by said delivering server to said portable communication terminal and charging a fee to a user of the portable communication terminal when a request of the regular sound data is transmitted from said portable communication terminal to said delivering server; and
   delivering a trial-listening sound data, which is the regular sound data to which an appending data indicating that the sound data is the trial-listening sound data is added in order to generate the trial-listening sound data, by said delivering server to said portable communication terminal without charging a fee to the user of said portable communication terminal when a request of the trial-listening sound data is transmitted from said portable communication terminal to the delivering server, wherein if the sound data delivered is a regular sound data, permitting the registration of the sound data as a sound data of an incoming call sound or a background music of said portable communication terminal, wherein if the sound data delivered is a trial-listening sound data, prohibiting the registration of the trial-listening sound data as a sound data of an incoming call or a background music of said portable communication terminal, and wherein if an instruction for purchasing the trial-listening sound data is received from said portable communication terminal to said server, altering the delivered trial-listening sound data from the trial-listening sound data to the regular sound data by erasing said appending data from the sound data and permitting the registration of the altered trial-listening sound data as a sound data of an incoming call sound or a background music of said portable communication terminal.

6. The method according to claim 5, said method further comprising a step of charging a fee to a user of the portable communication terminal if the instruction for purchasing the trial-listening sound data is transmitted from said portable communication terminal to said server.

7. The method according to claim 5, said method further comprising a step of notifying the user of the portable communication terminal that the trial-listening sound data cannot be registered as a sound data of an incoming call or a background music of said portable communication terminal, when an input operation for registering the trial-listening sound data as an incoming call sound or a background music is performed.

8. The method according to claim 6, further comprising a step of notifying the user of the portable communication terminal that the trial-listening sound data cannot be registered as a sound data of an incoming call or a background music of said portable communication terminal, when an input operation for registering the trial-listening sound data as an incoming call sound or a background music is performed. server comprises means for charging a fee to a user of the portable communication terminal if the instruction for purchasing the trial-listening sound data is transmitted from said portable communication terminal to said server.

9. A portable communication terminal communicable with a sound data delivering server, said portable communication terminal comprising:

requesting means for transmitting a request of either a regular sound data or a trial-listening sound data to said delivering server, said trial-listening sound data being the regular sound data to which an appending data indicating that the sound data is the trial-listening sound data is added in order to generate the trial-listening sound data;

storage means for storing said regular sound data or said trial-listening sound data delivered from said delivering server in accordance with said request;

reproduction means for reproducing said regular sound data or said trial-listening sound data stored in said storage means; and reproduction times limiting means for limiting the number of times said trial-listening sound data is reproduced, to a predetermined finite number.

10. A portable communication terminal communicable with a sound data delivering server, said portable communication terminal comprising:

requesting means for transmitting a request of either a regular sound data or a trial-listening sound data to said delivering server, said trial-listening sound data being the regular sound data to which an appending data indicating that the sound data is the trial-listening sound data is added in order to generate the trial-listening sound data;

storage means for storing said regular sound data or said trial-listening sound data delivered from said delivering server in accordance with said request;

reproduction means for reproducing said regular sound data or said trial-listening sound data stored in said storage means; and reproduction times limiting means for limiting the number of times said trial-listening sound data is reproduced, to a predetermined finite number.

11. A computer-readable recording medium containing a program applied to a portable communication computer communicable with a sound data delivering server, said program including:

a sound data requesting process for transmitting a request of either a regular sound data or a trial-listening sound data to said delivering server, said trial-listening sound data being the regular sound data to which an appending data indicating that the sound data is the trial-listening sound data is added in order to generate the trial-listening sound data;

a storage process for storing said regular sound data or said trial-listening sound data delivered from said delivering server in accordance with said request, in storage means; and a reproduction process for reproducing said regular sound data or said trial-listening sound data stored in said storage means, and for limiting the number or times said trial-listening sound data is reproduced, to a predetermined finite number.

12. The computer-readable recording medium of claim 11, wherein said delivering server comprises means for charging a fee to a user of the portable communication terminal if the instruction for purchasing the trial-listening sound data is transmitted from said portable communication terminal to said server.

* * * * *